US012636831B2

(12) United States Patent　　(10) Patent No.:　US 12,636,831 B2
　　Dorfinger et al.　　　　　　　　(45) Date of Patent:　　May 26, 2026

(54) SUBSTRATES AND ASSOCIATED MATERIALS FOR ADDITIVE MANUFACTURING

(71) Applicant: Align Technology, Inc., San Jose, CA (US)

(72) Inventors: Peter Dorfinger, Woodside, CA (US); Michael Christopher Cole, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 18/600,201

(22) Filed: Mar. 8, 2024

(65) Prior Publication Data

US 2024/0300174 A1　　Sep. 12, 2024

Related U.S. Application Data

(60) Provisional application No. 63/496,070, filed on Apr. 14, 2023, provisional application No. 63/489,510, filed on Mar. 10, 2023.

(51) Int. Cl.
　　*B29C 64/245*　　　(2017.01)
　　*B29C 64/124*　　　(2017.01)
　　　　　(Continued)

(52) U.S. Cl.
　　CPC .......... *B29C 64/245* (2017.08); *B29C 64/124* (2017.08); *B29C 64/223* (2017.08);
　　　　　(Continued)

(58) Field of Classification Search
　　CPC ... B29C 64/245; B29C 64/124; B29C 64/129; B29C 64/135; B65G 15/32; B65G 2812/02198
　　See application file for complete search history.

(56) References Cited

U.S. PATENT DOCUMENTS 6,210,162 B1　　4/2001　Chishti et al.
6,309,215 B1　　10/2001　Phan et al.
　　　　　(Continued)

FOREIGN PATENT DOCUMENTS

CN　　113085171 A　　7/2021
EP　　　3708337 A1 *　9/2020　........... B29C 64/135
　　　　　(Continued)

OTHER PUBLICATIONS

Machine translation of WO 2022/071224 A1, FIT (Foreign Image and Text), Apr. 7, 2022 (Year: 2022).*
　　　　　(Continued)

*Primary Examiner* — Benjamin A Schiffman
(74) *Attorney, Agent, or Firm* — FORTEM IP LLP

(57)　　　　　ABSTRACT
Substrates and associated materials for additive manufacturing are provided. In some embodiments, a device for manufacturing an object from a curable material includes a substrate configured to support the curable material during an additive manufacturing process. The substrate can be at least partially transparent to a wavelength of energy that cures the curable material. The substrate can include a first layer with a first material configured to inhibit adhesion to the curable material. The substrate can also include a second layer with a second material having one or more of increased mechanical strength or increased heat resistance relative to the first material.

20 Claims, 13 Drawing Sheets

(51) Int. Cl.
  B29C 64/223      (2017.01)
  B33Y 30/00       (2015.01)
  B33Y 10/00       (2015.01)

(52) U.S. Cl.
  CPC ...... B33Y 30/00 (2014.12); B29K 2995/0026 (2013.01); B33Y 10/00 (2014.12)

(56)                    References Cited

U.S. PATENT DOCUMENTS

| | | | |
|---|---|---|---|
| 6,450,807 | B1 | 9/2002 | Chishti et al. |
| 6,497,574 | B1 | 12/2002 | Miller |
| 6,749,414 | B1 | 6/2004 | Hanson et al. |
| 6,830,450 | B2 | 12/2004 | Knopp et al. |
| 6,957,118 | B2 | 10/2005 | Kopelman et al. |
| 6,976,627 | B1 | 12/2005 | Culp et al. |
| 7,092,784 | B1 | 8/2006 | Simkins |
| 7,192,273 | B2 | 3/2007 | McSurdy, Jr. |
| 7,220,124 | B2 | 5/2007 | Taub et al. |
| 7,236,842 | B2 | 6/2007 | Kopelman et al. |
| 7,245,977 | B1 | 7/2007 | Simkins |
| 7,261,533 | B2 | 8/2007 | Wrosz et al. |
| 7,335,024 | B2 | 2/2008 | Wen |
| 7,384,266 | B2 | 6/2008 | Wen |
| 7,435,084 | B2 | 10/2008 | Liu et al. |
| 7,472,789 | B2 | 1/2009 | Wu et al. |
| 7,476,100 | B2 | 1/2009 | Kuo |
| 7,481,647 | B2 | 1/2009 | Sambu et al. |
| 7,604,181 | B2 | 10/2009 | Culp et al. |
| 7,641,828 | B2 | 1/2010 | DeSimone et al. |
| 7,648,360 | B2 | 1/2010 | Kuo |
| 7,674,422 | B2 | 3/2010 | Kuo |
| 7,711,447 | B2 | 5/2010 | Lu et al. |
| 7,748,199 | B2 | 7/2010 | Sankaran et al. |
| 7,802,987 | B1 | 9/2010 | Phan |
| 7,819,659 | B2 | 10/2010 | Wen |
| 7,831,322 | B2 | 11/2010 | Liu et al. |
| 7,840,373 | B2 | 11/2010 | Culp et al. |
| 7,892,474 | B2 | 2/2011 | Shkolnik et al. |
| 7,922,490 | B2 | 4/2011 | Wen |
| 7,957,824 | B2 | 6/2011 | Boronvinskih et al. |
| 8,002,110 | B2 | 8/2011 | DeGroot et al. |
| 8,019,465 | B2 | 9/2011 | Spiridonov et al. |
| 8,030,588 | B2 | 10/2011 | Culp et al. |
| 8,087,932 | B2 | 1/2012 | Liu |
| 8,636,513 | B2 | 1/2014 | Wen |
| 8,765,031 | B2 | 7/2014 | Li et al. |
| 8,776,391 | B1 | 7/2014 | Kaza et al. |
| 9,108,338 | B2 | 8/2015 | Sirovskiy et al. |
| 9,403,238 | B2 | 8/2016 | Culp |
| 9,700,385 | B2 | 7/2017 | Webber |
| 9,844,424 | B2 | 12/2017 | Wu et al. |
| 9,943,386 | B2 | 4/2018 | Webber et al. |
| 9,943,991 | B2 | 4/2018 | Tanugula et al. |
| 10,162,264 | B2 | 12/2018 | McLeod et al. |
| 10,267,381 | B2 | 4/2019 | Herold |
| 10,336,102 | B2 | 7/2019 | Cole |
| 10,495,973 | B2 | 12/2019 | Cole |
| 10,537,406 | B2 | 1/2020 | Wu et al. |
| 10,783,629 | B2 | 9/2020 | Parpara et al. |
| 10,888,395 | B2 | 1/2021 | Kopelman |
| 10,993,783 | B2 | 5/2021 | Wu et al. |
| 11,045,283 | B2 | 6/2021 | Riley et al. |
| 11,103,330 | B2 | 8/2021 | Webber et al. |
| 11,189,021 | B2 | 11/2021 | Shah et al. |
| 11,273,011 | B2 | 3/2022 | Shanjani et al. |
| 11,295,444 | B2 | 4/2022 | Cherkas et al. |
| 11,318,667 | B2 | 5/2022 | Mojdeh et al. |
| 11,318,672 | B2 | 5/2022 | Elsey |
| 11,359,041 | B2 | 6/2022 | Ohara et al. |
| 11,370,173 | B2 | 6/2022 | Kelly et al. |
| 11,420,362 | B2 | 8/2022 | Mojdeh et al. |
| 11,511,485 | B2 | 11/2022 | Mojdeh et al. |
| 11,534,277 | B2 | 12/2022 | Chavez et al. |
| 11,554,000 | B2 | 1/2023 | Webber |
| 11,564,777 | B2 | 1/2023 | Kopelman et al. |
| 11,583,927 | B2 | 2/2023 | Rogren |
| 11,596,502 | B2 | 3/2023 | Webber et al. |
| 11,602,413 | B2 | 3/2023 | Chen et al. |
| 11,666,415 | B2 | 6/2023 | Wang et al. |
| 11,793,606 | B2 | 10/2023 | Cam et al. |
| 11,794,412 | B2 | 10/2023 | Dubelman et al. |
| 11,931,222 | B2 | 3/2024 | Webber et al. |
| 11,937,991 | B2 | 3/2024 | Webber et al. |
| 11,945,166 | B2 | 4/2024 | Meenakshisundaram et al. |
| 12,202,192 | B2 | 1/2025 | Gmeiner et al. |
| 12,319,006 | B2 | 6/2025 | Singh et al. |
| 2004/0243361 | A1 | 12/2004 | Steuben et al. |
| 2006/0093982 | A1 | 5/2006 | Wen |
| 2006/0093987 | A1 | 5/2006 | Wen |
| 2006/0093993 | A1 | 5/2006 | Wen |
| 2006/0127850 | A1 | 6/2006 | Wen |
| 2006/0127857 | A1 | 6/2006 | Liu et al. |
| 2006/0127858 | A1 | 6/2006 | Wen |
| 2006/0127859 | A1 | 6/2006 | Wen |
| 2006/0127860 | A1 | 6/2006 | Wen |
| 2006/0172250 | A1 | 8/2006 | Wen |
| 2006/0199145 | A1 | 9/2006 | Liu et al. |
| 2007/0092853 | A1 | 4/2007 | Liu et al. |
| 2007/0243502 | A1 | 10/2007 | Wen |
| 2008/0083348 | A1 | 4/2008 | Kuo et al. |
| 2009/0148814 | A1 | 6/2009 | Li et al. |
| 2013/0186558 | A1 | 7/2013 | Comb et al. |
| 2013/0241113 | A1 | 9/2013 | Geers et al. |
| 2014/0061974 | A1 | 3/2014 | Tyler |
| 2014/0265034 | A1 | 9/2014 | Dudley |
| 2015/0097316 | A1 | 4/2015 | DeSimone et al. |
| 2018/0345578 | A1 | 12/2018 | Enslow et al. |
| 2019/0046297 | A1 | 2/2019 | Kopelman et al. |
| 2020/0290262 | A1 | 9/2020 | Aguilar Mendez et al. |
| 2021/0030516 | A1 | 2/2021 | O'Leary et al. |
| 2021/0146619 | A1 | 5/2021 | Shusteff et al. |
| 2021/0187859 | A1 | 6/2021 | Gmeiner et al. |
| 2021/0259809 | A1 | 8/2021 | O'Leary et al. |
| 2021/0268721 | A1 | 9/2021 | Wang et al. |
| 2021/0276248 | A1 | 9/2021 | Boehm et al. |
| 2022/0227051 | A1 | 7/2022 | Regehly |
| 2022/0258420 | A1 | 8/2022 | Märklin |
| 2022/0332046 | A1 | 10/2022 | Lenzen et al. |
| 2022/0339827 | A1 | 10/2022 | Zhu et al. |
| 2022/0339859 | A1 | 10/2022 | Steele et al. |
| 2023/0302728 | A1 | 9/2023 | Yang et al. |
| 2023/0339181 | A1 | 10/2023 | Habibi et al. |
| 2024/0033993 | A1 | 2/2024 | Yang et al. |
| 2024/0100775 | A1 | 3/2024 | Förster-Romswinckel et al. |
| 2024/0140030 | A1 | 5/2024 | Lin et al. |
| 2024/0140031 | A1 | 5/2024 | Stromenger et al. |
| 2024/0140043 | A1 | 5/2024 | Cole et al. |
| 2024/0278496 | A1 | 8/2024 | Saurwalt |
| 2024/0300185 | A1 | 9/2024 | Meenakshisundaram et al. |
| 2025/0018650 | A1 | 1/2025 | Singh et al. |
| 2025/0073990 | A1 | 3/2025 | Cole et al. |
| 2025/0108562 | A1 | 4/2025 | Choudhary et al. |

FOREIGN PATENT DOCUMENTS

| | | | | | |
|---|---|---|---|---|---|
| JP | 2020136662 | A | * | 8/2020 | ....... H01L 21/67242 |
| KR | 20180004081 | A | | 1/2018 | |
| WO | 2015075094 | A1 | | 5/2015 | |
| WO | WO-2015170890 | A1 | * | 11/2015 | ............ B29C 67/00 |
| WO | 2016078838 | A1 | | 5/2016 | |
| WO | 2017115076 | A1 | | 7/2017 | |
| WO | 2018032022 | A1 | | 2/2018 | |
| WO | 2020070639 | A1 | | 4/2020 | |
| WO | 2020245456 | A1 | | 12/2020 | |
| WO | 2021087061 | A2 | | 5/2021 | |
| WO | 2021130657 | A1 | | 7/2021 | |
| WO | 2021130661 | A1 | | 7/2021 | |
| WO | 2022011456 | A1 | | 1/2022 | |
| WO | WO-2022071224 | A1 | * | 4/2022 | ............ B65H 5/021 |

(56)　　　　　References Cited

OTHER PUBLICATIONS

Wang, Siyang et al., Self-healing polymers, Nature Reviews Materials, 2020, vol. 5, pp. 562-583.
Owen, Michael J., Low Surface Energy Inorganic Polymers, Comments on Inorganic Chemistry, 2006, vol. 7, Issue 4, pp. 195-213.

\* cited by examiner

400c 402  410

406

408

414

404  416

$T_1$ $T_2$ $T_1$

400d

402

406

418a

408

418b

404

620

622

Support a curable material on a substrate during an additive manufacturing process

624

Determine that the substrate includes a damaged portion

626

Apply energy to the substrate to activate a self-healing process

628

Apply mechanical force to the substrate

630

Repair the damaged portion of the substrate via the self-healing process 806    800

804    802

812

810

814

816

820

822

Apply a first orthodontic appliance to a patient's teeth to reposition the teeth from a first tooth arrangement to a second tooth arrangement

824

Apply a second orthodontic appliance to the patient's teeth to reposition the teeth from the second tooth arrangement to a third tooth arrangement

900 —

902 —

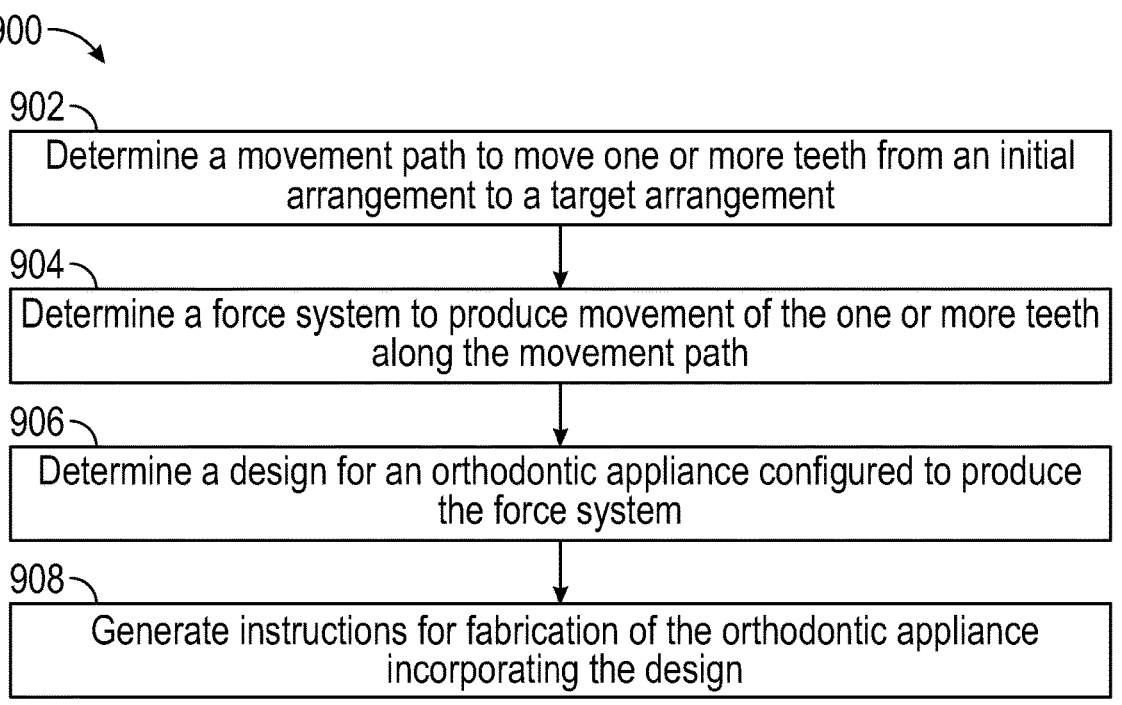

| 902 | Determine a movement path to move one or more teeth from an initial arrangement to a target arrangement |

904 — Determine a force system to produce movement of the one or more teeth along the movement path 906 — Determine a design for an orthodontic appliance configured to produce the force system 908 — Generate instructions for fabrication of the orthodontic appliance incorporating the design

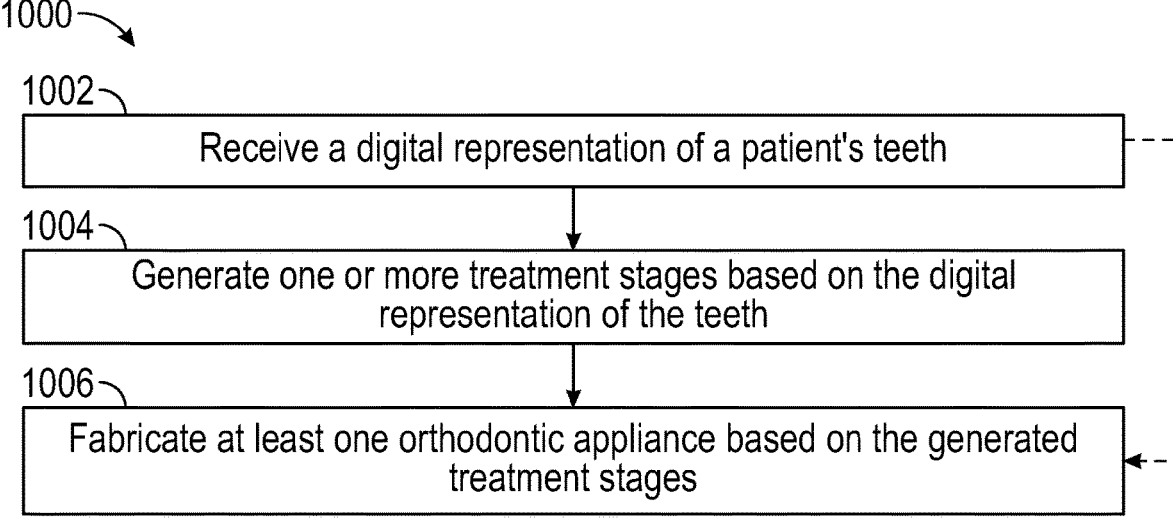

1002 — Receive a digital representation of a patient's teeth

1004 — Generate one or more treatment stages based on the digital representation of the teeth 1006 — Fabricate at least one orthodontic appliance based on the generated treatment stages

FIG. 10

SUBSTRATES AND ASSOCIATED MATERIALS FOR ADDITIVE MANUFACTURING

CROSS-REFERENCE TO RELATED APPLICATION(S)

The present application claims the benefit of priority to U.S. Provisional Application No. 63/489,510, filed Mar. 10, 2023, and U.S. Provisional Application No. 63/496,070, filed Apr. 14, 2023, the disclosures of which are incorporated by reference herein in their entirety.

TECHNICAL FIELD

The present technology generally relates to manufacturing, and in particular, to substrates and associated materials for additive manufacturing.

BACKGROUND

Additive manufacturing encompasses a variety of technologies that involve building up 3D objects from multiple layers of material. In some additive manufacturing systems, the material is supported by a transparent window or film, and energy is applied to the material through the window/film to cure the material. Because the material is in direct contact with the window/film, the window/film may become fouled or damaged by the material. Damage to the window/film may also occur due to other process conditions, such as high temperatures or mechanical stresses. Fouling or damage can compromise energy transmission through the window/film, which can interfere with the accuracy of the additive manufacturing process. Frequent cleaning and replacement of the window/film can be costly, labor-intensive, and time-consuming, and may therefore be impractical for large scale additive manufacturing operations.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

FIG. 9 illustrates a method for designing an orthodontic appliance, in accordance with embodiments of the present technology.

FIG. 10 illustrates a method for digitally planning an orthodontic treatment and/or design or fabrication of an appliance, in accordance with embodiments of the present technology.

DETAILED DESCRIPTION

Figure 1:
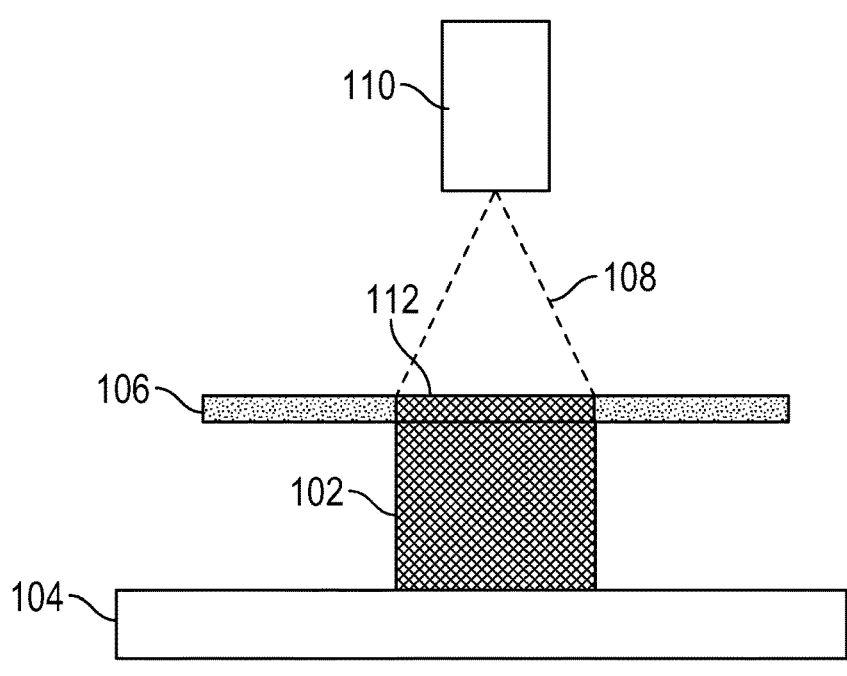
FIG. 1 is a partially schematic diagram providing a general overview of an additive manufacturing process, in accordance with embodiments of the present technology.

The present technology relates to substrates and associated materials for additive manufacturing. In some embodiments, for example, a device for manufacturing an object from a curable material includes a substrate configured to support the curable material during an additive manufacturing process, such as a carrier film, window, etc. The substrate can be at least partially transparent to a wavelength of energy that cures the curable material. In some embodiments, the substrate includes multiple functional layers, such as a first layer with a first material configured to inhibit adhesion to the curable material, and a second layer with a second material having increased mechanical strength and/or increased heat resistance relative to the first material. Alternatively or in combination, the substrate can include a self-healing material that, when activated by energy, repairs damage to the substrate that may occur due to contact with the curable material and/or other process conditions. Optionally, the substrate can be used in conjunction with an interfacial material that forms a liquid layer between the substrate and the curable material to inhibit adhesion and/or provide protection from damage.

The present technology can provide numerous advantages compared to conventional additive manufacturing components and materials. For instance, the substrates described herein can exhibit significantly reduced adhesion to the curable material and/or to the printed object, which can decrease the incidence of issues such as fouling, damage, and/or degradation of optical properties of the substrate. The use of multiple layers in the substrate can expand the types of anti-adhesive materials that may be incorporated into the substrate, since such materials may otherwise lack sufficient thermomechanical properties to withstand the process conditions for additive manufacturing (e.g., elevated temperatures and/or mechanical stresses). Moreover, substrates with self-healing capabilities can automatically repair certain types of damage, thus allowing the substrate to be used with a wider range of additive manufacturing materials, including materials with hard fillers that can scratch, tear, abrade, or otherwise damage the substrate over time. The use of liquid interfacial materials described herein can further reduce adhesion to the substrate and provide additional protection against damage due to mechanical contact. Accordingly, the substrates herein can be used for longer periods without manual cleaning or replacement, thus reducing manufacturing downtime, costs, and/or resource consumption.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," "lower," "left," right," etc., can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

I. Overview of Additive Manufacturing Technology

The systems, methods, and devices described herein are suitable for use with a wide variety of additive manufacturing techniques. Additive manufacturing (also referred to herein as "3D printing") includes a variety of technologies which fabricate 3D objects directly from digital models through an additive process. For example, additive manufacturing can be used to directly fabricate orthodontic appliances (e.g., aligners, palatal expanders, retainers, attachment placement devices, attachments), restorative objects (e.g., crowns, veneers, implants), and/or other dental appliances (e.g., oral sleep apnea appliances, mouth guards). Additional examples of dental appliances and associated methods that are applicable to the present technology are described in Section III below.

In some embodiments, additive manufacturing includes depositing a precursor material (e.g., a resin) onto a build platform. The precursor material can be cured, polymerized, melted, sintered, fused, and/or otherwise solidified to form a portion of the object and/or to combine the portion with previously formed portions of the object. In some embodiments, the additive manufacturing techniques provided herein build up the object geometry in a layer-by-layer fashion, with successive layers being formed in discrete build steps. Alternatively or in combination, the additive manufacturing techniques described herein can allow for continuous build-up of an object geometry.

Examples of additive manufacturing techniques include, but are not limited to, the following: (1) vat photopolymerization, in which an object is constructed from a vat or other bulk source of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) material extrusion, in which material is drawn though a nozzle, heated, and deposited layer-by-layer, such as fused deposition modeling (FDM) and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding. Optionally, an additive manufacturing process can use a combination of two or more additive manufacturing techniques.

For example, the additively manufactured object can be fabricated using vat photopolymerization process in which light is used to selectively cure a vat or other bulk source of a curable material (e.g., a polymerizable resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the material source, light source, and build platform.

As another example, the additively manufactured object can be fabricated using high temperature lithography (also known as "hot lithography"). High temperature lithography can include any photopolymerization process that involves heating a photopolymerizable material (e.g., a polymerizable resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° C. to 120° C., from 90° C. to 120° C., from 100° C. to 120° C., from 105° C. to 115° C., or from 105° C. to 110° C. The heating can lower the viscosity of the photopolymerizable material before and/or during curing, and/or increase reactivity of the photopolymerizable material. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Patent Publication Nos. 2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous three-dimensional path in order to form the object. Such methods are described in U.S. Pat. No. 10,162,264 and U.S. Patent Publication No. 2014/0061974, the disclosures of which are incorporated herein by reference in their entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting holographic light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Publication No. 2021/0146619, U.S. Patent Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

In yet another example, the additively manufactured object can be fabricated using a powder bed fusion process (e.g., selective laser sintering) involving using a laser beam to selectively fuse a layer of powdered material according to a desired cross-sectional shape in order to build up the object geometry. As another example, the additively manufactured object can be fabricated using a material extrusion process (e.g., fused deposition modeling) involving selectively depositing a thin filament of material (e.g., thermoplastic polymer) in a layer-by-layer manner in order to form an object. In yet another example, the additively manufactured object can be fabricated using a material jetting process involving jetting or extruding one or more materials onto a build surface in order to form successive layers of the object geometry.

The additively manufactured object can be made of any suitable material or combination of materials. As discussed above, in some embodiments, the additively manufactured object is made partially or entirely out of a polymeric material, such as a curable polymeric resin. The resin can be composed of one or more monomer components that are initially in a liquid state. The resin can be in the liquid state at room temperature (e.g., 20° C.) or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/087061, the disclosures of each of which are incorporated herein by reference in their entirety.

Optionally, the additively manufactured object can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after curing (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the additively manufactured object can be formed from multiple materials in a plurality of sequential manufacturing steps. For instance, a first portion of the object can be formed from a first material in accordance with any of the fabrication methods herein, then a second portion of the object can be formed from a second material in accordance with any of the fabrication methods herein, and so on, until the entirety of the object has been formed.

The additively manufactured object can be made of any suitable material or combination of materials. In some embodiments, the additively manufactured object is made partially or entirely out of a precursor material that is composed of one or more reactive components that change form when exposed to energy (e.g., electromagnetic energy, acoustic energy, radiation energy). The change in form can include, for example, changing from a monomeric form to an oligomeric and/or polymeric form, changing from an amorphous form to a crystalline form, changing from a liquid or semi-liquid form to a solid or semi-solid form, changing from a particulate or filament form to a continuous solid form, or combinations thereof.

For example, the precursor material can be a curable material, such as a resin. The resin can be composed of one or more polymerizable components, such as one or more monomers. The resin can initially be in a liquid state at room temperature (e.g., 20° C.) or at an elevated temperature (e.g., a temperature within a range from 50° C. to 120° C.). When exposed to energy, the monomers can undergo a polymerization reaction such that the resin solidifies into the desired object geometry. The monomers can be any molecule or compound capable of forming bonds with other monomers, thus resulting in a larger molecule with increased molecular weight. For example, the monomers can be vinylic monomers, cyclic monomers, monomers with functional groups that form covalent or ionic bonds, etc. In some embodiments, the bond-forming reaction occurs multiple times, such that the molecular weight of the resultant molecule increases with each successive bond-forming reaction. Examples of bond-forming reactions suitable for use with the techniques described herein include, but are not limited to, free radical polymerization, ionic polymerization, condensation polymerization, Diels-Alder reactions, photodimerization, carbene formation, nitrene formation, and suitable combinations thereof.

Alternatively or in combination, the polymerizable components can include reactive polymers and/or oligomers. The oligomers and/or polymers can react with each other, monomers, and/or other components to form larger molecules, e.g., via any of the bond-forming reactions described above.

In some embodiments, the polymerizable components (e.g., low molecular weight monomers, oligomers, polymers) form a high modulus phase within a polymerized material. In such embodiments, this phase can provide sufficient strength to the green state object to survive post-processing and/or can direct the final shape of the printed object. Alternatively, the polymerizable components can form a low modulus phase within the polymerized material or otherwise lower the local modulus of the object.

The curable material can include various additives, such as catalysts, blockers, viscosity modifiers, fillers, binders, reactive diluents, solvents, pigments and/or dyes, stabilizers, surface-active compounds, etc. For example, in some embodiments, the curable material includes a catalyst that, when exposed to energy, forms a reactive species that catalyzes a bond-forming reaction. The catalyst can be a photocatalyst that is activated or otherwise created by absorption of light (e.g., infrared (IR) light, visible light, or ultraviolet (UV) light). Examples of photocatalysts include, but are not limited to, photoinitiators (e.g., radical initiators, cationic initiators), photoacid generators, and photobase generators.

In some embodiments, the curable material includes a blocker that limits the depth of energy penetration into the curable material during the additive manufacturing process. For example, the blocker can be a photoblocker that absorbs the irradiating wavelength responsible for causing photoreactions (e.g., activation of a photocatalyst or photodimerization reaction).

In some embodiments, the curable material includes a viscosity modifier. The viscosity modifier can be a component that increases the viscosity of the curable material (e.g., a filler, binder, thixotropic agent). Alternatively, the viscosity modifier can be a component that decreases the viscosity of the curable material (e.g., reactive diluent, solvent).

In some embodiments, the curable material includes a filler. The filler can be an organic or inorganic filler, such as fumed silica, core-shell particles, talc, titanium dioxide, sugar, nanocellulose, graphite, carbon black, carbon nanotubes, etc. The filler can be a component that enhances the mechanical properties of the additively manufactured object, such as modulus, scratch resistance, etc.

In some embodiments the curable material includes a binder. The binder can be a high molecular weight polymer that is added to the curable material to increase the viscosity and/or to enhance various material properties after curing, such as polymethylmethacrylate, acrylonitrile butadiene styrene (ABS), etc.

In some embodiments, the curable material includes a reactive diluent. The reactive diluent can decrease the viscosity of the curable material, while also reacting with one or more other components to form part of the object.

In some embodiments, the curable material includes a solvent. The solvent can decrease the viscosity of the curable material and/or compatibilize two or more components of the curable material.

In some embodiments, the curable material includes a pigment and/or dye. The pigment and/or dye (e.g., titanium dioxide, red dye #40, carbon black) can add color and/or other function to the object.

In some embodiments, the curable material includes a stabilizer configured to stabilize one or more components (e.g., to prevent precipitation, aggregation, degradation). For example, the stabilizer can be an emulsifier that stabilizes the components of an emulsion.

In some embodiments, the curable material includes a surface-active compound. The surface-active compound can enhance wetting or adhesion of the curable material and/or object to another surface. Alternatively or in combination, the surface-active compound can facilitate debonding of the curable material and/or object to another surface. Examples or surface-active compounds include, but are not limited to, wax, silicone compounds, silanes, fluorinated compounds, etc.

Optionally, some or all of the components of the curable material can serve more than one function within the curable material and/or the printed object. For example, reactive diluents can be monomers and can also serve as viscosity modifiers; carbon black can be a pigment and also a photoblocker; and so on.

Additional representative examples of curable materials suitable for use with the additive manufacturing techniques herein are described in International Publication Nos. WO 2019/006409, WO 2020/070639, and WO 2021/087061, the disclosures of each of which are incorporated herein by reference in their entirety.

FIG. 1 is a partially schematic illustration providing a general overview of an additive manufacturing process, in accordance with embodiments of the present technology. In the illustrated embodiment, an object 102 is fabricated on a build platform 104 from a series of cured material layers, with each layer having a geometry corresponding to a respective cross-section of the object 102. To fabricate an individual object layer, a layer of curable material 106 (e.g., polymeric resin) is brought into contact with the build platform 104 (when fabricating the first layer of the object 102) or with the previously formed portion of the object 102 on the build platform 104 (when fabricating subsequent layers of the object 102). In some embodiments, the curable material 106 is formed on and supported by a substrate (not shown), such as a film. Energy 108 (e.g., light) from an energy source 110 (e.g., a laser, projector, or light engine) is then applied to the curable material 106 to form a cured material layer 112 on the build platform 104 or on the object 102. The remaining curable material 106 can then be moved away from the build platform 104 (e.g., by lowering the build platform 104, by moving the build platform 104 laterally, by raising the curable material 106, and/or by moving the curable material 106 laterally), thus leaving the cured material layer 112 in place on the build platform 104 and/or object 102. The fabrication process can then be repeated with a fresh layer of curable material 106 to build up the next layer of the object 102.

The illustrated embodiment shows a "top down" configuration in which the energy source 110 is positioned above and directs the energy 108 down toward the build platform 104, such that the object 102 is formed on the upper surface of the build platform 104. Accordingly, the build platform 104 can be incrementally lowered relative to the energy source 110 as successive layers of the object 102 are formed. In other embodiments, however, the additive manufacturing process of FIG. 1 can be performed using a "bottom up" configuration in which the energy source 110 is positioned below and directs the energy 108 up toward the build platform 104, such that the object 102 is formed on the lower surface of the build platform 104. Accordingly, the build platform 104 can be incrementally raised relative to the energy source 110 as successive layers of the object 102 are formed.

Figure 2:
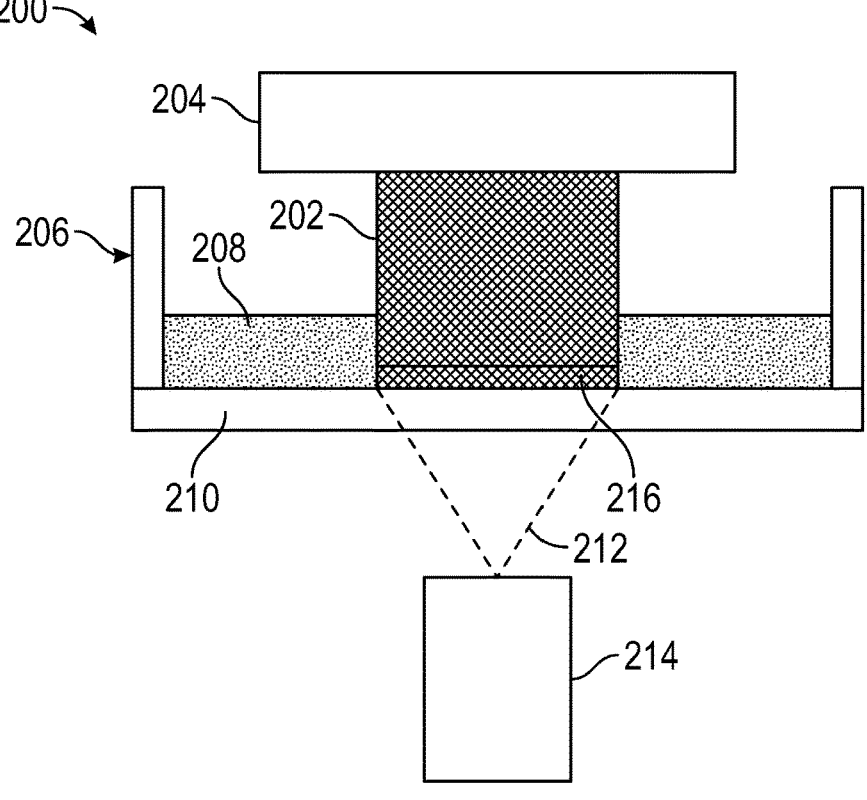
FIG. 2 is a partially schematic side view of a system for additive manufacturing configured in accordance with embodiments of the present technology.

FIG. 2 is a partially schematic illustration of a system 200 for additive manufacturing, in accordance with embodiments of the present technology. The system 200 is configured to fabricate one or more objects 202 using an additive manufacturing process (a single object 202 is shown in FIG. 2 merely for purposes of simplicity).

The system 200 is configured to fabricate the object 202 on a build platform 204 from a series of cured material layers, with each layer having a geometry corresponding to a respective cross-section of the object 202. To fabricate an individual object layer, the build platform 204 is lowered into a vat 206 (e.g., a reservoir, chamber, container, tank) of a curable material 208 (e.g., resin). The bottom wall of the vat 206 can be or include a window 210. The build platform 204 can be lowered into the curable material 208 until the height of the curable material 208 above the window 210 and below the build platform 204 (when fabricating the first layer of the object 202), or below the previously formed portion of the object 202 on the build platform 204 (when fabricating subsequent layers of the object 202) is at a desired layer thickness. Energy 212 (e.g., light) from an energy source 214 (e.g., a projector or light engine) is then applied to the curable material 208 to form a cured material layer 216 on the build platform 204 or on the object 202. The window 210 can be partially or fully transparent to the wavelength of the energy 212 to allow the energy 212 to pass through and reach the curable material 208. The build platform 204 can then be raised and/or the vat 206 can be lowered to separate the cured material layer 216 from the window 210, and allow additional curable material 208 to flow into the space above the window 210. The energy 212 can then be applied to build up the next layer of the object 202.

Figure 3:
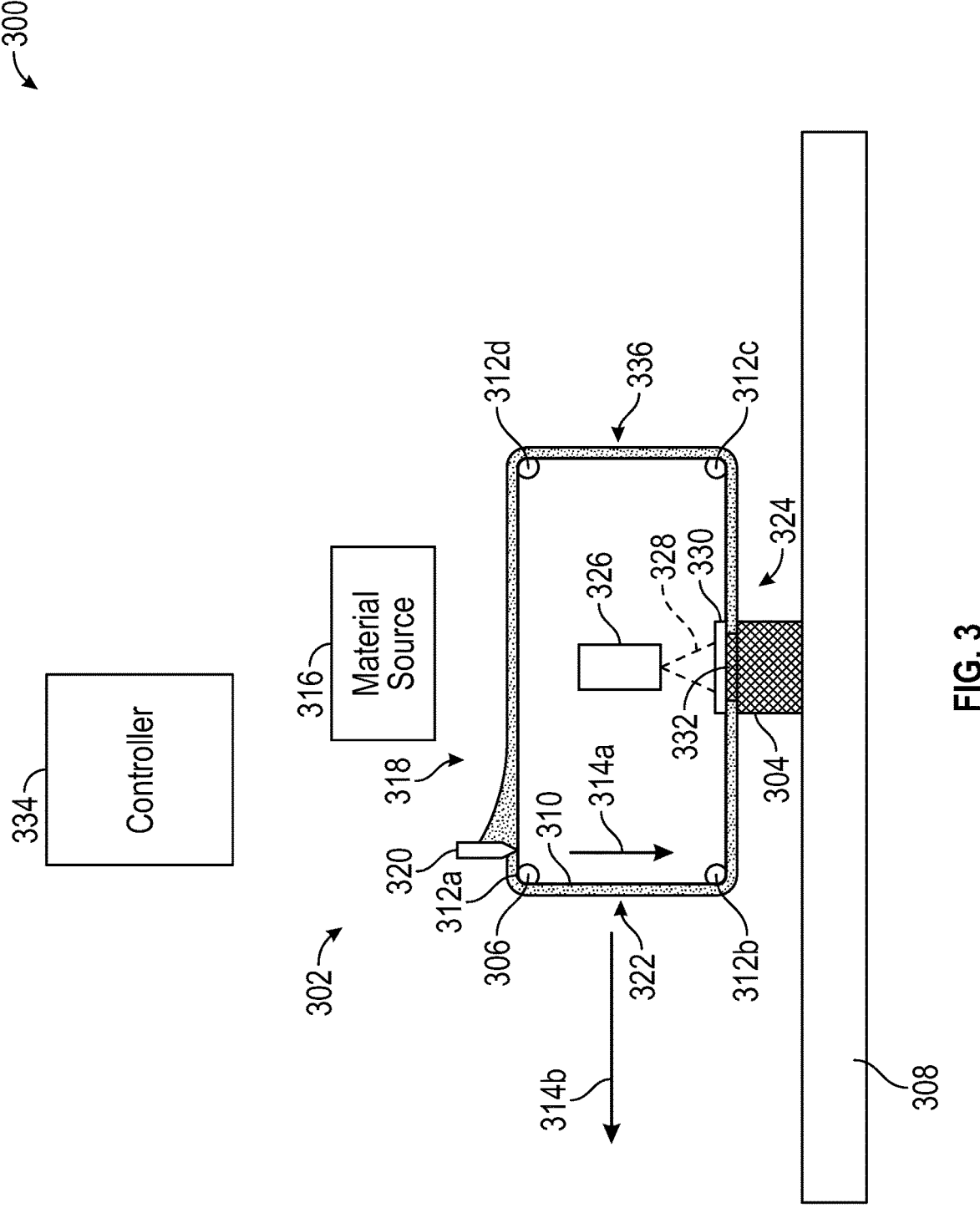
FIG. 3 is a partially schematic side view of a system for additive manufacturing configured in accordance with embodiments of the present technology.

FIG. 3 is a partially schematic side view of a system 300 for additive manufacturing configured in accordance with embodiments of the present technology. The system 300 is configured to fabricate one or more objects 304 using an additive manufacturing process (a single object 304 is shown in FIG. 3 merely for purposes of simplicity).

The system 300 includes a printer assembly 302 that forms the object 304 on a build platform 308 (e.g., a tray, plate, film, sheet, printer bed, or other planar substrate) by applying energy to a curable material 306 (e.g., a photopolymerizable resin). In the illustrated embodiment, the printer assembly 302 includes a carrier film 310 configured to deliver the curable material 306 to the build platform 308. The carrier film 310 can be a flexible loop of material having an outer surface and an inner surface. The outer surface of the carrier film 310 can adhere to and carry a thin layer of the curable material 306. The inner surface of the carrier film 310 can contact one or more rollers 312a-312d that rotate to move the carrier film 310 in a continuous loop trajectory, e.g., along the direction indicated by arrow 314a.

The printer assembly 302 can also include a material source 316 (shown schematically) configured to apply the curable material 306 to the carrier film 310 at a deposition zone 318 (also known as a "coating zone"). In the illustrated embodiment, the material source 316 is located at the upper portion of the printer assembly 302, and the deposition zone 318 is an upper horizontal segment of the carrier film 310 between rollers 312a and 312d. In other embodiments, however, the material source 316 and/or deposition zone 318 can be at different locations in the printer assembly 302. The material source 316 can include nozzles, ports, reservoirs, etc., that deposit the curable material 306 onto the outer surface of the carrier film 310. The system 300 can also include one or more blades 320 (e.g., doctor blades, recoater blades) that smooth the deposited curable material 306 into a relatively thin, uniform layer. For example, the curable material 306 can be formed into a layer having a thickness within a range from 100 microns to 500 microns, 200 microns to 300 microns, or any other desired thickness.

The curable material 306 can be conveyed by the carrier film 310 toward the build platform 308. In some embodiments, the curable material 306 is transported through a pre-print zone 322 downstream of the deposition zone 318. Although the pre-print zone 322 is illustrated as being a vertical segment of the carrier film 310 between the rollers 312a and 312b, in other embodiments, the system 300 can include one or more rollers between the rollers 312a and 312b that are horizontally offset from one or both of the rollers 312a and 312b to create one or more angled segments within the pre-print zone 322.

The build platform 308 can be located proximate to a print zone 324 of the carrier film 310. In the illustrated embodiment, the build platform 308 is located below the printer assembly 302, and the print zone 324 is a lower horizontal segment of the carrier film 310 between rollers 312*b* and 312*c*. In other embodiments, however, the build platform 308 and/or print zone 324 can be positioned at different locations in the printer assembly 302. The distance between the carrier film 310 and build platform 308 can be adjustable so that the curable material 306 at the print zone 324 can be brought into direct contact with the surface of the build platform 308 (when printing the initial layer of the object 304) or with the surface of the object 304 (when printing subsequent layers of the object 304). For example, the build platform 308 can include or be coupled to a motor (not shown) that raises and/or lowers the build platform 308 to the desired height during the manufacturing process. Alternatively or in combination, the printer assembly 302 can include or a be coupled to a motor (not shown) that raises and/or lowers to the printer assembly 302 relative to the build platform 308.

The printer assembly 302 includes an energy source 326 (e.g., a projector or light engine) that outputs energy 328 (e.g., light, such as UV light) having a wavelength configured to partially or fully cure the curable material 306. The carrier film 310 can be partially or completely transparent to the wavelength of the energy 328 to allow the energy 328 to pass through the carrier film 310 and onto the portion of the curable material 306 above the build platform 308. Optionally, a transparent plate 330 can be disposed between the energy source 326 and the carrier film 310 to guide the carrier film 310 into a specific position (e.g., height) relative to the build platform 308. During operation, the energy 328 can be patterned or scanned in a suitable pattern onto the curable material 306, thus forming a layer of cured material 332 onto the build platform 308 and/or on a previously formed portion of the object 304. The geometry of the cured material 332 can correspond to the desired cross-sectional geometry for the object 304. The parameters for operating the energy source 326 (e.g., exposure time, exposure pattern, exposure wavelength, energy density, power density) can be set based on instructions from a controller 334, as described in further detail below.

In some embodiments, the energy 328 is applied to the curable material 306 while the carrier film 310 moves to circulate the curable material 306 through the print zone 324. To maintain zero or substantially zero relative velocity between the curable material 306 and the build platform 308, the printer assembly 302 can concurrently move horizontally relative to the build platform 308 along the direction of arrow 314*b*. The motion of the printer assembly 302 can also increase the printable surface area of the build platform 308. The energy 328 output by the energy source 326 can be coordinated with the movement of the carrier film 310 and build platform 308 so that the layer of cured material 332 is formed with the correct geometry. For example, the energy source 326 can be a scrolling light engine (e.g., scrolling DLP) that outputs the energy 328 in a pattern that varies over time to match the motion of the printer assembly 302 and carrier film 310. In other embodiments, however, the printer assembly 302 can be a stationary device that does not move relative to the build platform 308 while the energy 328 is being applied to the curable material 306.

After curing, the newly formed layer of cured material 332 can be separated from the carrier film 310 and the remaining curable material 306 at the print zone 324. In some embodiments, the separation occurs at least in part due to peel forces produced by the carrier film 310 wrapping around the roller 312*c* immediately downstream of the print zone 324. The remaining curable material 306 can be conveyed by the carrier film 310 away from the build platform 308, and into a post-print zone 336 downstream of the print zone 324. Although the post-print zone 336 is illustrated as being a vertical segment of the carrier film 310 between the rollers 312*c* and 312*d*, in other embodiments, the system 300 can include one or more rollers between the rollers 312*c* and 312*d* that are horizontally offset from one or both of the rollers 312*c* and 312*d* to create one or more angled segments within the post-print zone 336. The presence of an angled segment of carrier film 310 immediately downstream of the print zone 324 can adjust the peel angle produced by the roller 312*c*, and thus, the peel force applied to the cured material 332, to enhance separation from the surrounding curable material 306.

The remaining curable material 306 conveyed away from the build platform 308 can be circulated by the carrier film 310 back toward the deposition zone 318. At the deposition zone 318, the material source 316 can apply additional curable material 306 onto the carrier film 310 and/or smooth the curable material 306 to re-form a uniform layer of curable material 306 on the carrier film 310. The curable material 306 can then be recirculated back through the pre-print zone 322, and then to the print zone 324 and build platform 308 to fabricate subsequent layers of the object 304. This process can be repeated to iteratively build up individual object layers on the build platform 308 until the object 304 is complete. The object 304 and build platform 308 can then be removed from the system 300 for post-processing.

Optionally, the printer assembly 302 can be configured to produce the object 304 via a high temperature lithography process utilizing a highly viscous resin. In such embodiments, the printer assembly 302 can include one or more heat sources (heating plates, infrared lamps, etc.—not shown) for heating the curable material 306 to lower the viscosity to a range suitable for additive manufacturing. The heat sources can be positioned near or in direct contact with the carrier film 310 to heat the curable material 306 supported by the carrier film 310. The heat sources can be located at any suitable portion of the printer assembly 302, such as on or within the build platform 308, on or within the material source 316, at the deposition zone 318, at the pre-print zone 322, at the print zone 324, at the post-print zone 336, or combinations thereof.

The controller 334 (shown schematically) is operably coupled to the printer assembly 302 (e.g., to the build platform 308, rollers 312*a*-312*d*, material source 316, and/or energy source 326) to control the operation thereof. The controller 334 can be or include a computing device including one or more processors and memory storing instructions for performing the additive manufacturing, error detection, and error correction operations described herein. For example, the controller 334 can receive a digital representation of the object 304 to be fabricated and can transmit instructions to the energy source 326 to apply energy 328 to the curable material 306 to form the object cross-sections. As previously discussed, the controller 334 can control various operational parameters of the energy source 326, such as the exposure time, exposure pattern, exposure wavelength, energy density, power density, and/or other parameters affecting the printing process. Optionally, the controller 334 can also determine and control other operational parameters, such as the positioning of the printer assembly 302 (e.g., vertical and/or horizontal position) relative to the build platform 308, the movement speed and/or direction of the carrier film 310, the rotational speed and/or direction of the rollers 312a-312d, the amount of curable material 306 deposited by the material source 316, the thickness of the curable material 306 on the carrier film 310, and/or the amount of heating applied to the curable material 306 by the heat source(s).

Although FIGS. 1-3 illustrate representative examples of additive manufacturing processes and systems, this is not intended to be limiting, and the embodiments described herein can be adapted to other types of additive manufacturing techniques (e.g., material jetting, binder jetting, FDM, powder bed fusion, sheet lamination, directed energy deposition).

II. Substrates for Additive Manufacturing and Associated Materials

The present technology provides substrates that can be used to support a curable material used in an additive manufacturing process (e.g., a polymerizable resin) while also allowing curing energy to pass through, and associated materials, systems, and methods. The substrate can be a component of an additive manufacturing system that is interposed between an energy source (e.g., a light engine or projector) and the curable material. For example, the substrate can be a portion of a vat or other container that holds a volume of the curable material, such as the window 210 of FIG. 2, a portion of a container for a VAM process (e.g., the sidewalls, lid, and/or bottom of the container), etc. As another example, the substrate can be an optically transparent film that carries a layer of the curable material, such as the carrier film 310 of FIG. 3. The substrates described herein can be flexible or rigid, and can have any suitable form factor, such as windows, plates, films, membranes, sheets, and the like.

In some embodiments, the substrates herein have one or more optical properties that allow the energy to reach and cure the curable material at selected locations to form a portion of an additively manufactured object. For example, the substrate can be partially or completely transparent to one or more energy wavelengths that cure the curable material, such as IR, visible, and/or UV wavelengths. The energy wavelength can be within a range from 10 nm to 200 nm, from 200 nm to 350 nm, from 350 nm to 450 nm, from 450 nm to 550 nm, from 550 nm to 650 nm, from 650 nm to 750 nm, from 750 nm to 850 nm, from 850 nm to 1000 nm, or from 1000 nm to 1500 nm. The transmittance of the substrate to the energy wavelength(s) can be greater than or equal to 50%, 60%, 70%, 75%, 80%, 85%, 90%, 95%, 99%, or 99.9%. The substrate can also exhibit little or no scattering of the energy. In embodiments where the substrate is made up of multiple different materials, as described further below, the materials can have the same or closely matching refractive indices (e.g., the difference in refractive indices is within a range from 0.1 to 0.3, and/or the refractive index contrast is no more than 0.05, 0.01, or 0.005). The substrate can also exhibit little or no reflectance of the energy. The optical properties of the substrate (e.g., transmittance, scattering, reflectance, absorbance) can be measured using spectrophotometric techniques known to those of skill in the art.

In some embodiments, the substrates herein are configured to operate under elevated temperatures, such as temperatures greater than or equal to 30° C., 40° C., 50° C., 60° C., 70° C., 80° C., 90° C., 100° C., 110° C., 120° C., 130° C., 140° C., or 150° C.; and/or temperatures within a range from 50° C. to 120° C., from 50° C. to 150° C., from 90° C. to 120° C., from 90° C., to 150° C., from 100° C. to 120° C., from 100° C. to 150° C., from 105° C. to 115° C., from 105°

C. to 110° C., or from 120° C. to 150° C. For example, the substrate can operate under elevated temperature with little or no deformation (e.g., plastic deformation), deflection, warping, melting, creeping, rupturing, and/or other undesirable changes in the geometry (e.g., shape and/or dimensions) of the substrate. Creep behavior of the substrate can be determined by measuring the strain in the substrate when subjected to a constant load (e.g., tensile or compressive load) at a constant temperature over a specified time interval. In some embodiments, the substrate exhibits no more than 25%, 20%, 15%, 10%, 5%, 2%, or 1% strain when operating and/or loaded under elevated temperatures, for a time interval of at least 12 hours, 24 hours, 48 hours, 72 hours, 96 hours, 120 hours, 200 hours, 500 hours, 1000 hours, 2000 hours, 5000 hours, or 10,000 hours. As another example, the substrate can maintain the same or similar mechanical properties under elevated temperatures, such as modulus (e.g., elastic modulus, flexural modulus, storage modulus), elongation to break, elongation to yield, strength, hardness, scratch resistance, etc. For instance, the value of a mechanical property of the substrate can change by no more than 20%, 15%, 10%, or 5% when measured at room temperature versus the elevated temperature over the specified time interval. The substrate can have a glass transition temperature ($T_g$) that is at least 5° C., 10° C., 15° C., or 20° C. greater than an average and/or maximum temperature of the additive manufacturing process (e.g., an average and/or maximum temperature to which the curable material is heated). For example, the $T_g$ of the substrate can be at least 30° C., 40° C., 50° C., 60° C., 70° C., 80° C., 90° C., 100° C., 110° C., 120° C., 130° C., 140° C., or 150° C.

In embodiments where the substrate is rigid (e.g., the window 210 of FIG. 2), the substrate can have a tensile strength of at least 1 MPa, 5 MPa, 10 MPa, 15 MPa, or 20 MPa. In embodiments where the substrate is flexible (e.g., the carrier film 310 of FIG. 3), the substrate can have a tensile strength of at least 0.05 MPa, 0.01 MPa, 0.05 MPa, 1 MPa, or 5 MPa.

In some embodiments, the substrates herein have a thickness of at least 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1 mm, 1.25 mm, 1.5 mm, 1.75 mm, or 2 mm; and/or no more than 5 mm, 4 mm, 3 mm, 2 mm, 1.75 mm, 1.5 mm, 1.25 mm, 1 mm, 0.9 mm, 0.8 mm, 0.7 mm, 0.6 mm, 0.5 mm, 0.4 mm, 0.3 mm, 0.2 mm, or 0.1 mm. The thickness can be within a range from 0.05 mm to 0.25 mm, 0.05 mm to 0.5 mm, 0.05 mm to 1 mm, 0.1 mm to 0.2 mm, 0.1 mm to 0.5 mm, 0.1 mm to 1 mm, 0.5 mm to 1 mm, 0.5 mm to 2 mm, or 1 mm to 5 mm.

The substrates herein can be made out of any suitable material, such as one or more polymeric materials (e.g., thermoplastic polymers and/or thermoset polymers). In some embodiments, the substrates herein are made partially or entirely out of a polysiloxane (e.g., polydimethylsiloxane (PDMS)), a polyester (e.g., polyethylene terephthalate (PET)), a fluoropolymer (e.g., fluorinated ethylene propylene (FEP), ethylene tetrafluoroethylene (ETFE)), a polycarbonate, a polyimide (e.g., Kapton), a polyurethane, a polysulfone, or a combination thereof (e.g., a copolymer, mixture, or composite of one or more of the above). Additional examples of materials that can be included in the substrate are described further below.

The substrates herein can be composed of a single layer of material, or can be composed of multiple layers of material, such two, three, four, five, ten, twenty, or more layers. In embodiments where multiple layers are used, some or all of the layers can have different functionalities, or some or all of the layers can have the same or similar functionalities. Examples of functionalities that can be incorporated into a layer of a substrate include, but are not limited to, any of the following: providing mechanical support, providing heat resistance, providing chemical resistance, inhibiting adhesion of the curable material and/or cured material, increasing oxygen levels, facilitating oxygen diffusion and/or transport, enhancing adhesion to other layers, enhancing contact with components of a printer assembly, enhancing energy transmission, reducing energy reflectance, absorbing one or more energy wavelengths, providing self-healing capabilities, acting as a reservoir for liquids, or suitable combinations thereof.

A. Multilayered Substrates

FIGS. 4A-4D are partially schematic illustrations of multilayered substrates for additive manufacturing configured in accordance with embodiments of the present technology. The embodiments of FIGS. 4A-4D can be incorporated into any of the additive manufacturing systems and devices described herein, such as the window 210 of FIG. 2 or the carrier film 310 of FIG. 3. Additionally, any of the features of the substrates of FIGS. 4A-4D can be combined with each other and/or with any of the other embodiments of substrates provided herein.

Figure 4A:
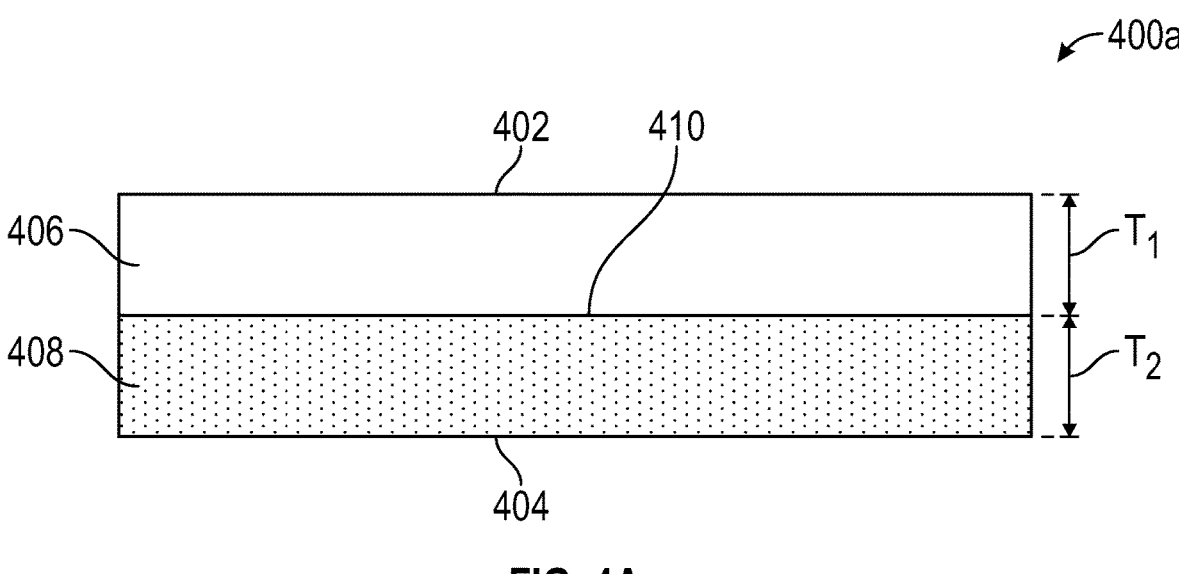
FIG. 4A is a partially schematic side view of a multilayered substrate for additive manufacturing configured in accordance with embodiments of the present technology.

FIG. 4A is a side view of a substrate 400a for additive manufacturing configured in accordance with embodiments of the present technology. The substrate 400a includes a first surface 402 (e.g., an upper surface) and a second surface 404 opposite the first surface 402 (e.g., a lower surface). The first surface 402 can be oriented toward a curable material for forming an additively manufactured object (e.g., a polymerizable resin—not shown). In some embodiments, the first surface 402 is configured to directly contact the curable material, while in other embodiments, the first surface 402 can be separated from the curable material via an interfacial material, as described in detail in Section II.C below. The second surface 404 can be oriented toward an energy source that provides energy to cure the curable material (e.g., a projector or light engine—not shown).

As shown in FIG. 4A, the substrate 400a can include a first layer 406 and a second layer 408. The first layer 406 can form part or all of the first surface 402 of the substrate 400a, and the second layer 408 can form part or all of the second surface 404 of the substrate 400a. The first layer 406 can be connected to (e.g., in direct contact with) the second layer 408 at an interface region 410 between the first layer 406 and the second layer 408. In some embodiments, the first layer 406 and the second layer 408 are discrete components that are coupled to each other via laminating, adhesives, bonding, welding (e.g., laser welding, solvent welding), fasteners, and/or other suitable attachment techniques. Alternatively, the first layer 406 and the second layer 408 can be integrally formed with each other as a single unitary component via coextrusion, additive manufacturing, and/or other suitable multi-material manufacturing techniques. Optionally, one of the first layer 406 or the second layer 408 can be provided as an initial layer, and the other layer can be coated (e.g., spray coated, dip coated, spin coated), deposited (e.g., via chemical vapor deposition, physical deposition), or otherwise formed onto the initial layer. For example, the second layer 408 can be provided as a preformed film, and the first layer 406 can be a thin coating that is applied onto the second layer 408; or vice-versa. One or both of the first layer 406 and the second layer 408 can be pretreated to improve adhesion to the other layer, such as by activating one or more surfaces of the first layer 406 and/or the second layer 408 (e.g., via corona treatment and/or other surface modification techniques).

The first layer 406 can have a first thickness $T_1$, such as a thickness of at least 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1 mm, 1.25 mm, 1.5 mm, 1.75 mm, or 2 mm; and/or no more than 2 mm, 1.75 mm, 1.5 mm, 1.25 mm, 1 mm, 0.9 mm, 0.8 mm, 0.7 mm, 0.6 mm, 0.5 mm, 0.4 mm, 0.3 mm, 0.2 mm, 0.1 mm, or 0.05 mm. The first thickness $T_1$ can be within a range from 0.01 mm to 0.05 mm, 0.05 mm to 0.1 mm, 0.1 mm to 0.2 mm, 0.1 mm to 0.5 mm, 0.1 mm to 1 mm, 0.5 mm to 1 mm, 0.5 mm to 2 mm, or 1 mm to 2 mm. Optionally, the first layer 406 can be one or more molecular monolayers formed on the second layer 408, such that the first thickness $T_1$ is on a nanometer or sub-nanometer scale.

The second layer 408 can have a second thickness $T_2$, which can be greater than, equal to, or less than the first thickness $T_1$. The second thickness $T_2$ can be at least 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1 mm, 1.25 mm, 1.5 mm, 1.75 mm, or 2 mm; and/or no more than 2 mm, 1.75 mm, 1.5 mm, 1.25 mm, 1 mm, 0.9 mm, 0.8 mm, 0.7 mm, 0.6 mm, 0.5 mm, 0.4 mm, 0.3 mm, 0.2 mm, 0.1 mm, or 0.05 mm. The second thickness $T_2$ can be within a range from 0.01 mm to 0.05 mm, 0.05 mm to 0.1 mm, 0.1 mm to 0.2 mm, 0.1 mm to 0.5 mm, 0.1 mm to 1 mm, 0.5 mm to 1 mm, 0.5 mm to 2 mm, or 1 mm to 2 mm. Optionally, the second layer 408 can be one or more molecular monolayers formed on the first layer 406, such that the second thickness $T_2$ is on a nanometer or sub-nanometer scale.

The first layer 406 can be formed from one or more first materials, and the second layer 408 can be formed from one or more second materials. For example, the first layer 406 and/or the second layer 408 can each include one or more polymers, such as any of the polymer types described herein. In some embodiments, the first layer 406 and the second layer 408 are made out of different materials, such that the first layer 406 and the second layer 408 exhibit different properties and/or functionalities. For example, the first layer 406 and the second layer 408 can differ from each other with respect to one or more of the following: modulus (e.g., flexural modulus, elastic modulus), $T_g$, elongation to break, elongation to yield, strength, hardness, scratch resistance, roughness, degradability, color, refractive index, transparency, porosity, morphology, chemical composition, degree of polymerization, crosslink density, phase, crystallinity, morphology, permeability, surface energy, hydrophobicity, oleophobicity, oxygen solubility, inhibitor solubility, chemical diffusion, chemical inertness, and/or swellability.

In some embodiments, the first layer 406 is a separation layer that is configured to inhibit adhesion of material to the first surface 402 of the substrate 400a, such as adhesion of the curable material before energy is applied (e.g., unpolymerized resin) and/or adhesion of the cured material that is formed when energy is applied to the curable material (e.g., polymerized resin). Adhesion of curable and/or cured material can occur, for example, due to mechanical contact between these materials and the first surface 402 (e.g., adsorption), chemical bonding between the cured material and the first surface 402 (e.g., due to activation of the first surface 402 by the curing energy and/or radical initiators within the curable material), or combinations thereof. Adhesion of curable and/or cured material to the first surface 402 can cause fouling of and/or damage to the first surface 402, reduce energy transmission through the first surface 402, increase the forces needed to release the cured material from the first surface 402, and/or cause the cured material to delaminate from the rest of the object rather than releasing from the first surface 402.

Accordingly, the first layer 406 can include at least one first material that inhibits adhesion of curable and/or cured material to the first surface 402 of the substrate 400a. For example, the first material (and thus, the first surface 402) can have a relatively low surface energy, such as a surface energy less than or equal to 50 dynes/cm, 40 dynes/cm, 38 dynes/cm, 36 dynes/cm, 34 dynes/cm, 32 dynes/cm, 30 dynes/cm, 28 dynes/cm, 26 dynes/cm, 24 dynes/cm, 22 dynes/cm, 20 dynes/cm, 18 dynes/cm, 16 dynes/cm, 14 dynes/cm, 12 dynes/cm, or 10 dynes/cm; and/or within a range from 10 dynes/cm to 40 dynes/cm, or 18 dynes/cm to 36 dynes/cm. In some embodiments, the first material is or includes a fluorinated material, such as a fluoropolymer. Examples of fluoropolymers that can be used in the first layer 406 to inhibit adhesion include, but are not limited to: FEP, ETFE, polytetrafluoroethylene (PTFE), perfluoro-alkoxy alkane (PFA), polyvinylidene fluoride (PVDF), poly-chlorotrifluoroethylene (PCTFE), ethylenechlorotrifluoro-ethylene (ECTFE), perfluorocycloalkene (PFCA), perfluoromethylvinyl ether (PMVE), perfluorosulfonic acid (PFSA) polymer, perfluoropolyether (PFPE), and combinations thereof. Alternatively or in combination, the first material can be or include a siloxane or a polysiloxane (e.g., a PDMS derivative, a silicone oil), or a silane or a polysilane. Optionally, in embodiments where the curable and/or cured material has a low surface energy, the first material (and thus, the first surface 402) can have a relatively high surface energy to inhibit adhesion to the curable and/or cured material.

Alternatively or combination, the first material (and thus, the first surface 402) can have little or no solubility with the curable and/or cured material. For example, if the curable and/or cured material is a polar compound, the first material can be a nonpolar compound; if the curable and/or cured material is a nonpolar compound, the first material can be a polar compound; if the curable and/or cured material is a hydrophilic compound, the first material can be a hydrophobic compound; if the curable and/or cured material is a hydrophobic compound, the first material can be a hydrophilic compound; if the curable and/or cured material is an oleophilic compound, the first material can be an oleophobic compound; if the curable and/or cured material is an oleophobic compound, the first material can be an oleophilic compound; and so on. In some embodiments, only the solubility of one or more of selected components of the curable material is considered, such as the solubility of the photoinitiator, the reactive diluent, the photoblocker, the solvent, the surface active agent, and/or other components described herein. For instance, the solubility of one or more components of the curable material in the first material can be less than 5 wt %, 2 wt %, 1 wt %, 0.5 wt %, 0.1 wt %, 0.05 wt %, or 0.01 wt % at a desired temperature (e.g., room temperature and/or printing temperature).

Optionally, the first material can reduce adhesion by providing an inhibitor (e.g., oxygen) to the first surface 402 and/or to the curable material proximate to the first surface 402. In some embodiments, oxygen inhibits curing of the curable material by inhibiting free radical polymerization reactions. Increasing the oxygen concentration at or near the first surface 402 can limit the extent of curing at or near the first surface 402, therefore avoiding formation of covalent linkages with the first surface 402 and/or preventing the cured material from coming into direct contact with the first surface 402. In some embodiments, the first material (and thus, the first layer 406) can be a material having high solubility and/or permeability to the inhibitor, such as a fluoropolymer. Optionally, the inhibitor can be one or more chemical components that are added to the substrate 400a. The inhibitor can diffuse from the first surface 402 into the curable material to prevent curing at or proximate to the first surface 402. In other embodiments, the inhibitors may not diffuse into the curable material, and may instead remain immobilized within or near the first surface 402. Examples of inhibitors include, but are not limited to, nitroxyl radicals, nitro and nitroso compounds, antioxidants, hydroquinones, amine compounds, and ascorbic acid. The type of inhibitor can be selected based on the curing mechanism for the curable material (e.g., radical polymerization, ionic polymerization, and/or others).

The first layer 406 can also provide other functions, alternatively or in addition to serving as a separation layer to reduce adhesion. For example, the first layer 406 can be chemically resistant to the curable material, e.g., to polymerizable components of the curable material as well as any additives that are present in the curable material (e.g., catalysts, blockers, viscosity modifiers, fillers, binders, reactive diluents, solvents, pigments and/or dyes, stabilizers, surface-active compounds). The first material of the first layer 406 can exhibit little or no degradation when exposed to the curable material. Additionally, the first material can inhibit diffusion of the curable material or individual components thereof into the substrate 400a (e.g., toward the second layer 408). Examples of materials that can confer chemical resistance and/or inhibit diffusion include PDMS, FEP, PTFE, ETFE, PFA, PCDF, ECTFE, PFCA, PMVE, PFSA, and PFPE. In some embodiments, fully inorganic materials are used, such as polyphosphazenes and/or polysiloxanes. Optionally, the first layer 406 can exhibit self-healing properties, as described further below in Section II.B.

In some embodiments, the second layer 408 is a support layer that enhances the overall thermomechanical properties of the substrate 400a. As discussed herein, the substrate 400a can be exposed to elevated temperatures during the additive manufacturing process. Depending on the configuration of the additive manufacturing system, the substrate 400a can also be subjected to various forces, such as tensile forces, compression forces, shear forces, etc. The thermomechanical properties of the first layer 406 alone may not be sufficient to withstand the heating and/or mechanical stresses that may occur during the additive manufacturing process. Accordingly, the second layer 408 can reinforce the first layer 406 so that the substrate 400a exhibits substantially no dimensional changes when subjected to elevated temperatures and/or mechanical stresses, as described herein.

The second layer 408 can include at least one second material that enhances the mechanical strength (e.g., creep resistance) and/or heat resistance of the substrate 400a. For example, the second material can have a $T_g$ that is at least 5° C., 10° C., 15° C., or 20° C. greater than an average and/or maximum temperature of the additive manufacturing process. For example, the $T_g$ of the second material can be at least 30° C., 40° C., 50° C., 60° C., 70° C., 80° C., 90° C., 100° C., 110° C., 120° C., 130° C., 140° C., or 150° C. In some embodiments, the $T_g$ of the second material is greater than the $T_g$ of the first material of the first layer 406, e.g., by at least 5° C., 10° C., 15° C., 20° C., 30° C., 40° C., 50° C., 60° C., 70° C., 80° C., 90° C., or 100° C.

The second material can exhibit less creep than the first material of the first layer 406 under the conditions of the additive manufacturing process. In some embodiments, the second material exhibits no more than 25%, 20%, 15%, 10%, 5%, 2%, or 1% strain under a constant applied stress and temperature for a time interval of at least 12 hours, 24 hours, 48 hours, 72 hours, 96 hours, 120 hours, 200 hours, 500 hours, 1000 hours, 2000 hours, 5000 hours, or 10,000 hours. For example, the applied stress can be within a range from 1 MPa to 5 MPa, 1 MPa to 10 MPa, or 4 MPa to 6 MPa. The applied stress can be less than or equal to 1 MPa, or greater than or equal to 10 MPa. The temperature can be room temperature or an elevated temperature (e.g., 100° C.).

The second material can have a higher elastic modulus than the first material of the first layer 406. In some embodiments, the second material has an elastic modulus greater than or equal to 0.5 GPa, 1 GPa, 1.5 GPa, 2 GPa, 2.5 GPa, 3 GPa, 3.5 GPa, 4 GPa, 4.5 GPa, 5 GPa, or 10 GPa. The elastic modulus of the second material can be greater than the elastic modulus of the first material by at least 0.25 GPa, 0.5 GPa, 0.75 GPa, 1 GPa, 2 GPa, 5 GPa, or 10 GPa.

In some embodiments, the second material is or includes a polymeric material, such as a siloxane or a polysiloxane (e.g., PDMS), a polyester (e.g., PET, polyethylene tereph-thalate glycol (PETG)), a polycarbonate, a polyacrylate (e.g., polymethyl methacrylate (PMMA)), a polyimide (e.g., Kapton), a polyurethane, a polysulfone, polyvinyl chloride (PVC), cyclic olefin copolymer (COC), polyethylene (PE), polypropylene (PP), styrene methyl methacrylate (SMMA), styrene acrylonitrile (SAN), ABS, or a combination thereof.

As described above, during the additive manufacturing process, energy can be directed toward the second surface 404 of the substrate 400a to reach a curable material in contact with or proximate to the first surface 402 of the substrate 400a. Accordingly, the first layer 406 and the second layer 408 can both be partially or fully transparent to the energy wavelength(s) for curing the curable material. In some embodiments, the first material of the first layer 406 and the second material of the second layer 408 each exhibit a transmittance of at least 50%, 60%, 70%, 75%, 80%, 85%, 90%, 95%, 99%, or 99.9% for the energy wavelength(s). Optionally, the first material and the second material can have the same or similar refractive indices to reduce scat-tering at the interface region 410 (e.g., the difference in refractive indices can be within a range from 0.1 to 0.3, and/or the refractive index contrast can be no more than 0.05, 0.01, or 0.005).

Figure 4B:
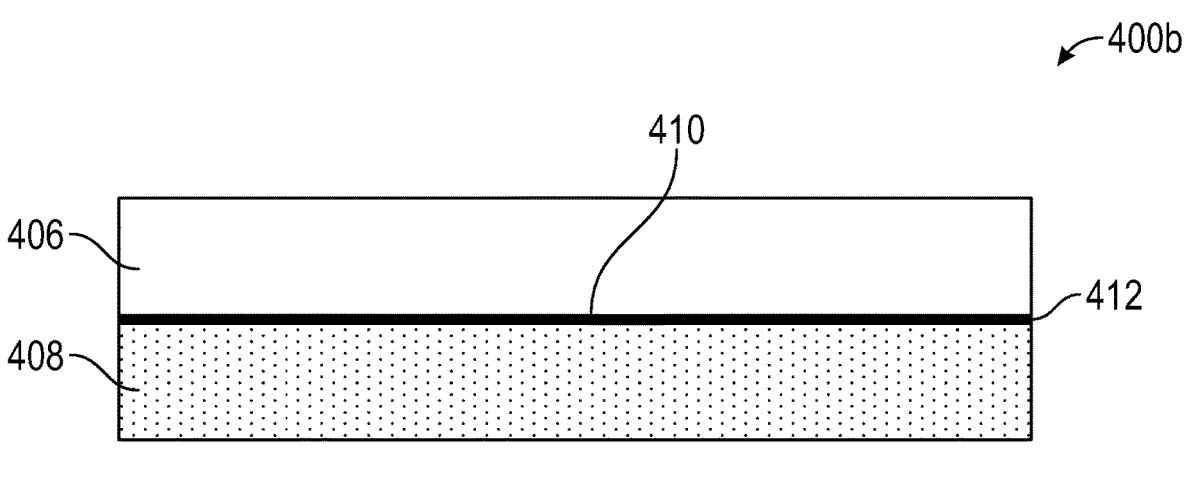
FIG. 4B is a partially schematic side view of another multilayered substrate for additive manufacturing configured in accordance with embodiments of the present technology.
Figure 4C:
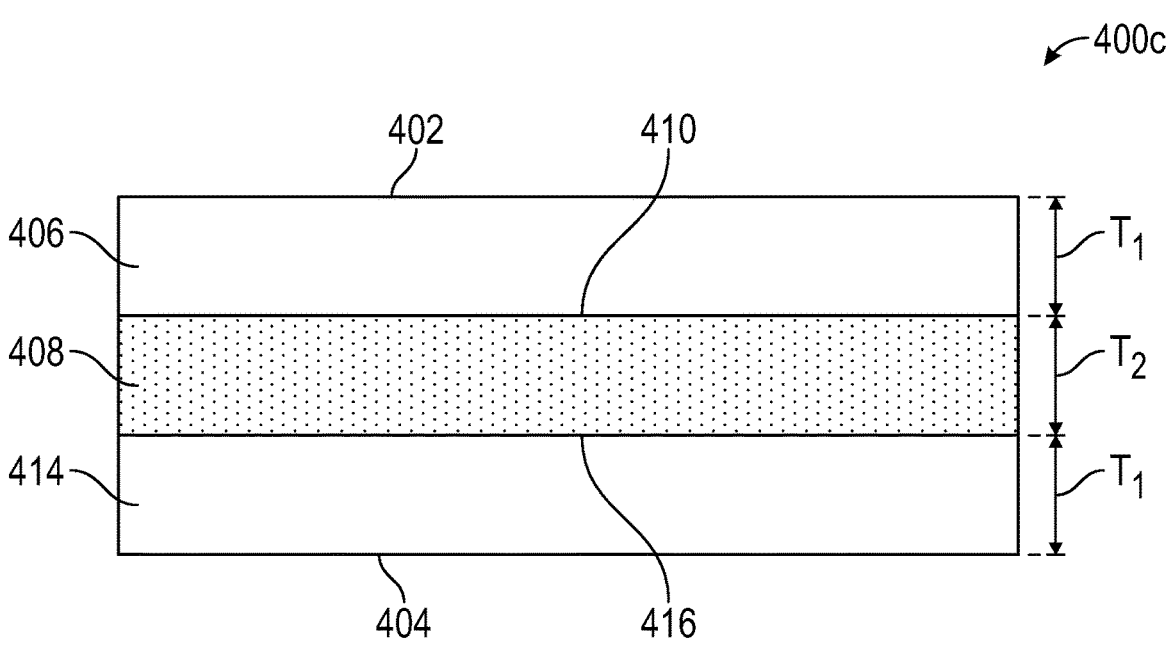
FIG. 4C is a partially schematic side view of another multilayered substrate for additive manufacturing configured in accordance with embodiments of the present technology.
Figure 4D:
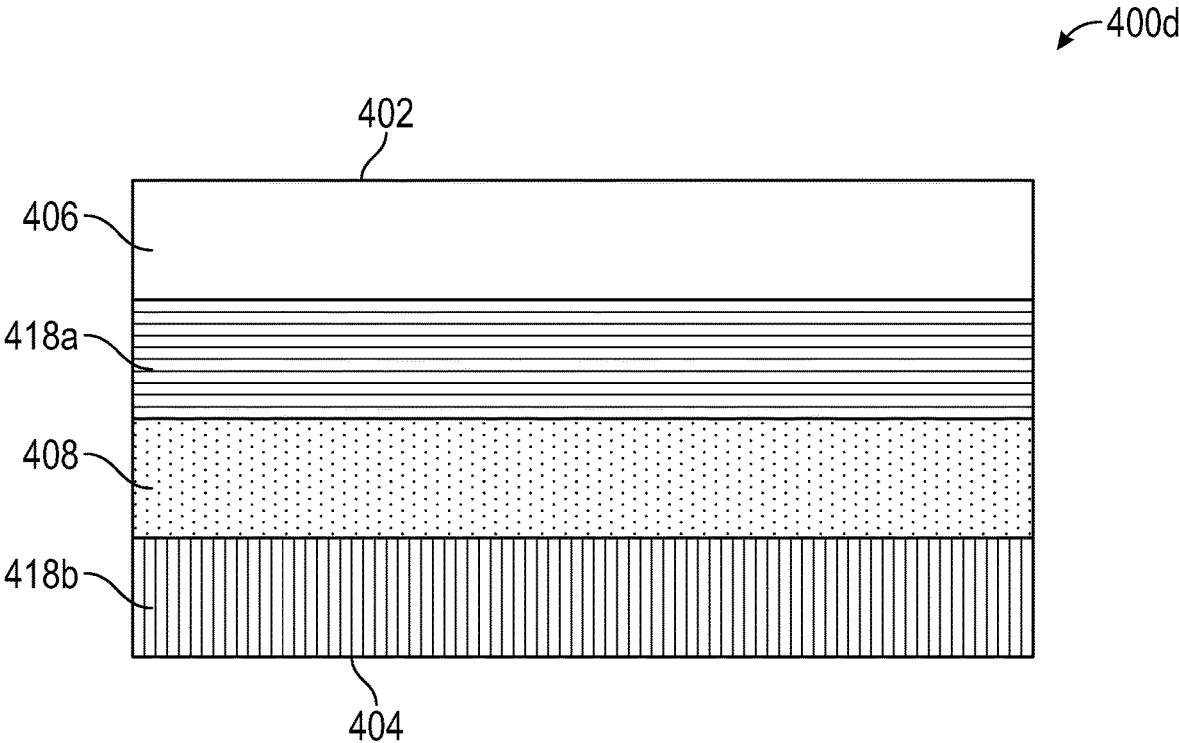
FIG. 4D is a partially schematic side view of yet another multilayered substrate for additive manufacturing configured in accordance with embodiments of the present technology.

FIGS. 4B-4D illustrate additional examples of substrates with multiple layers configured in accordance with embodi-ments of the present technology. The features of the embodi-ments of FIG. 4B-4D can be generally similar to the embodiment of FIG. 4A. Accordingly, the following discus-sion of FIGS. 4B-4D will be limited to those features that differ from the embodiment shown in FIG. 4A.

FIG. 4B is a side view of another substrate 400b for additive manufacturing configured in accordance with embodiments of the present technology. The substrate 400b can be generally similar to the substrate 400a of FIG. 4A, except that the substrate 400b includes an adhesion layer 412 between the first layer 406 and the second layer 408. The adhesion layer 412 can be made partially or entirely out of an adhesive material that affixes the first layer 406 to the second layer 408, such as an epoxy adhesive, a polyurethane adhesive, an acrylic-based adhesive, a cyanoacrylate adhe-sive, hot glue, mixed random or block copolymers of the materials of the first layer 406 and the second layer 408, and/or other adhesives that interact with the materials of the substrate 400b.

The adhesion layer 412 can span part of or the entirety of the interface region 410 between the first layer 406 and the second layer 408. Although FIG. 4B illustrates the adhesion layer 412 as being a single continuous layer, in other embodiments, the adhesion layer 412 can include a plurality of discrete portions at different locations along the interface region 410. The adhesion layer 412 can have any suitable thickness, which can be greater than, equal to, or less than the first thickness $T_1$ of the first layer 406 and/or the second thickness $T_2$ of the second layer 408. The thickness of the adhesion layer 412 can be at least 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1 mm, 1.25 mm, 1.5 mm, 1.75 mm, or 2 mm; and/or no more than 2 mm, 1.75 mm, 1.5 mm, 1.25 mm, 1 mm, 0.9 mm, 0.8 mm, 0.7 mm, 0.6 mm, 0.5 mm, 0.4 mm, 0.3 mm, 0.2 mm, 0.1 mm, or 0.05 mm. The thickness of the adhesion layer 412 can be within a range from 0.01 mm to 0.05 mm, 0.05 mm to 0.1 mm, 0.1 mm to 0.2 mm, 0.1 mm to 0.5 mm, 0.1 mm to 1 mm, 0.5 mm to 1 mm, 0.5 mm to 2 mm, or 1 mm to 2 mm. Optionally, the adhesion layer 412 can be one or more molecular monolay-ers, such that the thickness of the adhesion layer 412 is on a nanometer or sub-nanometer scale.

The substrate 400b shown in FIG. 4B can be formed in many different ways. In some embodiments, one of the first layer 406 or the second layer 408 is provided as an initial layer, the adhesion layer 412 is coupled to the initial layer or formed on the initial layer, then the other of the first layer 406 or the second layer 408 is coupled to the adhesion layer 412 or formed on the adhesion layer 412. As another example, the first layer 406, second layer 408, and adhesion layer 412 can be discrete components that are assembled and coupled to each other concurrently to form the substrate 400b. Optionally, any of the first layer 406, second layer 408, and/or adhesion layer 412 can be integrally formed with each other as a single unitary component via coextrusion, additive manufacturing, and/or other suitable multi-material manufacturing techniques. Any of the first layer 406, second layer 408, and/or adhesion layer 412 can be pretreated to further improve adhesion to other layers of the substrate 400b.

The adhesion layer 412 can be partially or fully transpar-ent to the energy wavelength(s) for curing the curable material. In some embodiments, the material of the adhesion layer 412 exhibits a transmittance of at least 50%, 60%, 70%, 75%, 80%, 85%, 90%, 95%, 99%, or 99.9% for the energy wavelength(s). Optionally, the material of the adhe-sion layer 412 can have the same or similar refractive indices as the first material of the first layer 406 and the second material of the second layer 408 to reduce scattering at the interface region 410 (e.g., the difference in refractive indices can be within a range from 0.1 to 0.3, and/or the refractive index contrast can be no more than 0.05, 0.01, or 0.005).

FIG. 4C is a side view of another substrate 400c for additive manufacturing configured in accordance with embodiments of the present technology. The substrate 400c can be generally similar to the substrate 400a of FIG. 4A, except that the substrate 400c includes a third layer 414. The third layer 414 is positioned at a side of the second layer 408 opposite the first layer 406, such that the third layer 414 forms part or all of the second surface 404 of the substrate 400a. The third layer 414 can be coupled to the second layer 408 at an interface region 416 using any of the techniques described herein. In some embodiments, the third layer 414 is directly connected and contacts the second layer 408 along the interface region 416, while in other embodiments, the third layer 414 can be indirectly coupled to the second layer 408 via an adhesion layer (e.g., similar to the adhesion layer 412 of FIG. 4B).

The third layer 414 can be identical or similar to the first layer 406 to reduce deformation of the substrate 400c due to thermal mismatch between the first layer 406, the second layer 408, and the third layer 414. For example, in the illustrated embodiment, the third layer 414 has the same thickness $T_1$ as the first layer 406. The third layer 414 can also be made out of the same first material(s) as the first layer 406, and thus can have the same or similar energy transmissivity properties as the first layer 406.

FIG. 4D is a side view of yet another substrate 400d for additive manufacturing configured in accordance with embodiments of the present technology. The substrate 400d can be generally similar to the substrate 400a of FIG. 4A, except that the substrate 400d includes one or more additional layers, such as an additional layer 418a between the first layer 406 and the second layer 408, and/or an additional layer 418b between the second layer 408 and the second surface 404 (collectively, "additional layer(s) 418"). Optionally, either the additional layer 418a or the additional layer 418b can be omitted.

The substrate 400d can be formed with the first layer 406, the second layer 408, and the additional layer(s) 418 using any of the techniques described herein. The additional layer 418a can be directly connected to and in contact with the first layer 406 and the second layer 408, or can be indirectly coupled to the first layer 406 and/or the second layer 408 via one or more respective adhesion layers (e.g., similar to the adhesion layer 412 of FIG. 4B). Similarly, the additional layer 418b can be directly connected to and in contact with the second layer 408, or can be indirectly coupled to the second layer 408 via an adhesion layer (e.g., similar to the adhesion layer 412 of FIG. 4B).

The additional layer(s) 418 can each independently have any suitable thickness. For example, the thickness of any of the additional layer(s) 418 can be at least 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1 mm, 1.25 mm, 1.5 mm, 1.75 mm, or 2 mm; and/or no more than 2 mm, 1.75 mm, 1.5 mm, 1.25 mm, 1 mm, 0.9 mm, 0.8 mm, 0.7 mm, 0.6 mm, 0.5 mm, 0.4 mm, 0.3 mm, 0.2 mm, 0.1 mm, or 0.05 mm; and/or within a range from 0.01 mm to 0.05 mm, 0.05 mm to 0.1 mm, 0.1 mm to 0.2 mm, 0.1 mm to 0.5 mm, 0.1 mm to 1 mm, 0.5 mm to 1 mm, 0.5 mm to 2 mm, or 1 mm to 2 mm. Optionally, any of the additional layer(s) 418 can be one or more molecular monolayers having nanometer or sub-nanometer thicknesses.

The additional layer(s) 418 can each independently be configured to perform any suitable function within the substrate 400d, such as providing mechanical support, providing heat resistance, providing chemical resistance, increasing oxygen levels, enhancing adhesion to other layers, enhancing contact with components of a printer assembly, enhancing energy transmission, reducing energy reflectance, providing self-healing capabilities, or suitable combinations thereof. The material composition of the additional layer(s) 418 can be selected based on the desired functionality of that layer.

For example, the additional layer 418a can be or include a barrier layer that inhibits diffusion of components of the curable material toward the second surface 404 and/or enhances chemical resistance of the substrate 400d to the curable material. Examples of materials that can be included in the barrier layer include FEP, PTFE, ETFE, PFA, PVDF, ECTFE, PFCA, PMVE, PFSA, and PFPE.

As another example, the additional layer 418a can be or include a compatibility layer having a surface energy between the surface energy of the first layer 406 and the second layer 408. In some embodiments, the first layer 406 has a lower surface energy (e.g., less than or equal to 30 dynes/cm, 25 dynes/cm, or 20 dynes/cm) while the second layer 408 has a higher surface energy (e.g., greater than or equal to 30 dynes/cm, 40 dynes/cm, or 50 dynes/cm). For instance, the surface energy of the second layer 408 can be higher than the surface energy of the first layer 406 by at least 10 dynes/cm, 20 dynes/cm, 30 dynes/cm, 40 dynes/cm, or 50 dynes/cm. Accordingly, the additional layer 418a can have a higher surface energy than the first layer 406 and a lower surface energy than the second layer 408. The presence of a compatibility layer can improve the quality of the substrate 400d by reducing the likelihood of layer delamination. In some embodiments, the compatibility layer is made partially or entirely out of a random or block copolymer of the materials of the first layer 406 and the second layer 408. In a further example, the additional layer 418b can be or include an anti-slip layer to improve contact between the second surface 404 and a component of a printer assembly. For instance, in embodiments where the substrate 400d is part of a movable carrier film (e.g., the carrier film 310 of FIG. 3), the anti-slip layer can improve gripping and/or traction to components that move the carrier film (e.g., the rollers 312a-312d of FIG. 3). The anti-slip layer can include a material that increases the coefficient of friction of the second surface 404 (e.g., relative to the coefficient of friction of the first surface 402 and/or the second material of the second layer 408). Examples of materials that can be used in the anti-slip layer include PET, PETG, PC, PMMA, PVC, COC, PE, PP, SMMA, SAN, polyvinyl alcohol (PVA), and ABS.

In yet another example, the additional layer 418b can be or include an anti-reflection layer that reduces reflectance of the second surface 404 to the energy wavelengths for curing the curable material. This approach can increase the amount of energy transmitted through the substrate 400d to the curable material, thus enhancing energy efficiency of the additive manufacturing process. The anti-reflection layer can be made out of a material having a refractive index between the refractive index of the second material of the second layer 408, and the refractive index of the medium through which the energy is transmitted to reach the substrate 400d (e.g., air).

The additional layer(s) 418 can be partially or fully transparent to the energy wavelength(s) for curing the curable material. In some embodiments, the material(s) of the additional layer(s) exhibit a transmittance of at least 50%, 60%, 70%, 75%, 80%, 85%, 90%, 95%, 99%, or 99.9% for the energy wavelength(s). Optionally, the material(s) of the additional layer(s) can have the same or similar refractive indices as the other materials of the substrate 400d (e.g., the difference in refractive indices can be within a range from 0.1 to 0.3, and/or the refractive index contrast can be no more than 0.05, 0.01, or 0.005).

The embodiments of FIGS. 4A-4D can be modified in many ways. For example, although FIGS. 4A-4D depict distinct layers with sharp transitions at the interface regions between neighboring layers, in other embodiments, any pair of neighboring layers can be blended with each other at the interface between the layers to provide a gradual transition. Additionally, any of the layers of FIGS. 4A-4D can be made up of a plurality of discrete sublayers (e.g., two, three, four, five, or more sublayers) that collectively provide the properties attributed to that layer.

Any of the layers of FIGS. 4A-4D can include one or more additives, such as fibers (e.g., to increase mechanical strength), dyes (e.g., to absorb certain energy wavelengths), fillers, binders, antioxidants, polymer stabilizers, plasticizers, etc. For example, fibers made of organic and/or inorganic materials can be incorporated into any of the layers of FIGS. 4A-4D to provide additional tensile strength and/or to reduce creep. In such embodiments, the substrates can be adapted to reduce light scatter that may be caused by the presence of such fibers. For instance, anti-reflective coatings (e.g., coatings having a refractive index between that of the layer material and the fiber material) can be used to reduce scattering. Alternatively or in combination, the fibers can be localized to certain sections of the substrate, while other sections of the substrate may not include any fibers.

In some embodiments, the substrates herein are initially provided as an elongate component (e.g., a film, sheet, strip) having two free ends, and the free ends are subsequently coupled to each other to form a loop. A loop-shaped substrate can be used as a carrier film that moves in a continuous loop trajectory to convey a curable material through an additive manufacturing system (e.g., the carrier film 310 of FIG. 3). The quality of the connection can affect the usability of the loop-shaped substrate. For example, if the connection region is not sufficiently smooth, this can interfere with the application of a uniform layer of curable material to the substrate on or proximate to the connection region. Moreover, the substrate can be more susceptible to failure (e.g., separation, rupture, plastic deformation, degradation) at or near the connection region.

Accordingly, embodiments of the present technology provide techniques for joining the ends of a substrate to form a smooth and durable connection. For example, the surface of the connection region (e.g., the surface oriented toward the curable material) can have a height that is no more than 0.1 cm, 0.075 cm, 0.05 cm, 0.025 cm, 0.001 cm, 0.0075 cm, 0.005 cm, 0.0025 cm, or 0.001 cm above the surface of neighboring regions of the substrate. Optionally, the surface of the connection region can be substantially free of gaps, bumps, and/or other irregularities that may interfere with application of a uniform layer of the curable material onto the surface and/or transmission of energy through the connection region. Moreover, the connection region can be configured to withstand elevated temperatures, mechanical stresses, the chemical components of the curable material, and/or other process conditions that the substrate may be exposed to during additive manufacturing.

Figure 5A:
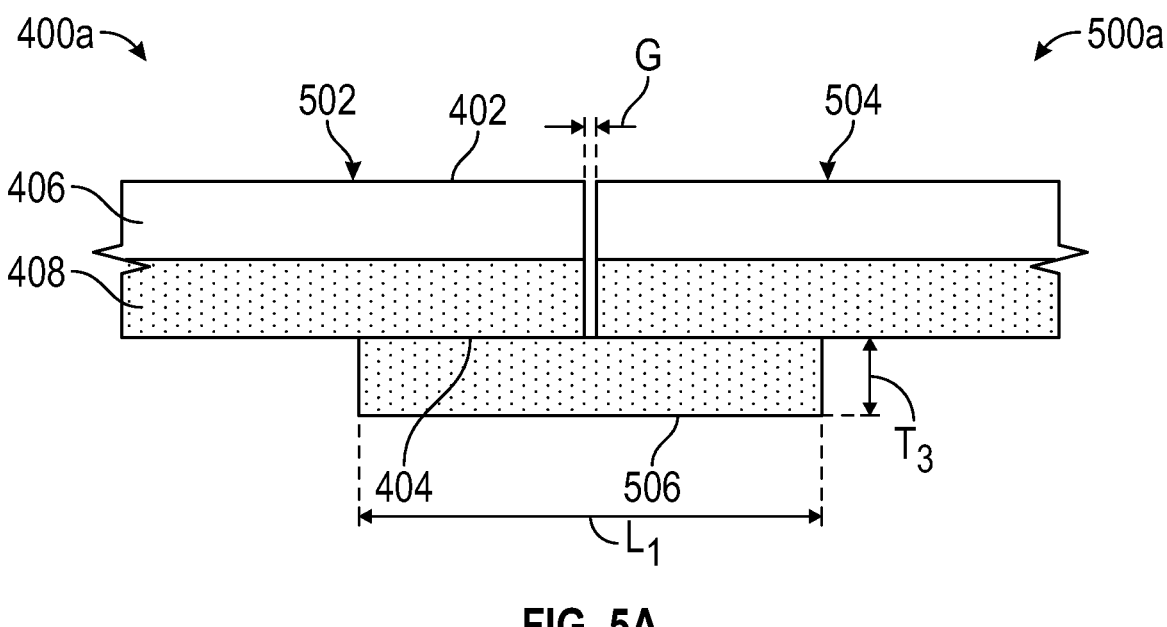
FIG. 5A is a partially schematic side view of a connection region of a multilayered substrate, in accordance with embodiments of the present technology.

FIG. 5A is a partially schematic side view of a connection region 500a of the substrate 400a, in accordance with embodiments of the present technology. The substrate 400a can include a first end portion 502, a second end portion 504 opposite the first end portion 502, and an elongate body portion between the first end portion 502 and the second end portion 504 (truncated in FIG. 5A). The length of the elongate body portion can be sized to fit around the rollers of a printer assembly (e.g., the rollers 312a-312d of FIG. 3), such as a length of at least 10 cm, 20 cm, 30 cm, 40 cm, or 50 cm.

The first end portion 502 and the second end portion 504 can be coupled to each other at the connection region 500a so that the substrate 400a is formed into a loop, with the first surface 402 of the substrate 400a forming the outer surface of the loop, and the second surface 404 of the substrate 400a forming the inner surface of the loop. As described herein, the first surface 402 can convey a layer of curable material, and the second surface 404 can contact the rollers of the printer assembly. An energy source (e.g., the energy source 326 of FIG. 3) can be positioned within the loop to output energy through the substrate 400a and toward the curable material carried by the first surface 402.

In the illustrated embodiment, the first end portion 502 and second end portion 504 are laterally spaced apart from each other by a gap distance G. The gap distance G can be any suitable size, such as no more than 1 cm, 0.5 cm, 0.25 cm, or 0.1 cm; and/or at least 0.01 cm, 0.1 cm, 0.25 cm, or 0.5 cm. In other embodiments, the first end portion 502 can directly contact the second end portion 504 such that the gap distance G is zero.

In the illustrated embodiment, the first end portion 502 and the second end portion 504 are coupled to each other via a bridge segment 506. The bridge segment 506 can be a short section of material (e.g., a tape, strip, sheet, film) that is coupled to the second surface 404 of the substrate 400a to connect the first end portion 502 to the second end portion 504. For example, the bridge segment 506 can be coupled to the second layer 408 of the substrate 400a using welding (e.g., laser welding, solvent welding), bonding, laminating, adhesives, fasteners, and/or other suitable attachment techniques. Optionally, the second surface 404 can be pretreated to improve adhesion to the bridge segment 506 (e.g., via corona treatment and/or other surface modification techniques).

The bridge segment 506 can be made out of the same material(s) as the second layer 408, which can be advantageous for creating a smooth, seamless connection between the second layer 408 and the bridge segment 506. Alternatively, the bridge segment 506 can be made out of a different material than the second layer 408, but can have similar properties as the second material(s) of the second layer 408 (e.g., similar surface energy, similar polarity/nonpolarity, similar hydrophobicity/hydrophilicity, similar oleophobicity/oleophilicity). The use of the same or similar material(s) in the bridge segment 506 and second layer 408 can facilitate creation of a smooth and durable connection between the first end portion 502 and the second end portion 504 of the substrate 400a. In some embodiments, the bridge segment 506 is or includes a polymeric material, such as a polysiloxane (e.g., PDMS), a polyester (e.g., PET, PETG), a polycarbonate, a polyacrylate (e.g., PMMA), a polyimide (e.g., Kapton), a polyurethane, a polysulfone, PVC, COC, PE, PP, SMMA, SAN, ABS, or a combination thereof.

Although the bridge segment 506 is illustrated as having a single layer, in other embodiments, the bridge segment 506 can include multiple layers, some or all of which can be composed of different materials and/or have different properties. In embodiments where the bridge segment 506 is composed of multiple layers, the layer closest to the second surface 404 can be made out of the same or similar materials as the second layer 408. The other layers of the bridge segment 506 can also be made out of the same or similar materials as the second layer 408, or can be made out of materials having different properties than the second layer 408.

The dimensions of the bridge segment 506 can be varied as desired. For example, the bridge segment 506 can have a length $L_1$ that is shorter than the length of the substrate 400a, but sufficiently long to span the connection region 500a, and adhere securely to both the first end portion 502 and the second end portion 504. The length $L_1$ can be less than or equal to 10 cm, 5 cm, 4 cm, 3 cm, 2 cm, 1 cm; and/or greater than or equal to 0.5 cm, 1 cm, 2 cm, 3 cm, 4 cm, or 5 cm.

In embodiments where the first end portion 502 and the second end portion 504 are spaced apart by a gap distance G, the length $L_1$ can be greater than the gap distance G.

The bridge segment 506 can have a thickness $T_3$, which can be greater than, equal to, or less than the thickness of the second layer 408. For instance, the thickness $T_3$ can be at least 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1 mm, 1.25 mm, 1.5 mm, 1.75 mm, or 2 mm; and/or no more than 2 mm, 1.75 mm, 1.5 mm, 1.25 mm, 1 mm, 0.9 mm, 0.8 mm, 0.7 mm, 0.6 mm, 0.5 mm, 0.4 mm, 0.3 mm, 0.2 mm, 0.1 mm, or 0.05 mm; and/or within a range from 0.01 mm to 0.05 mm, 0.05 mm to 0.1 mm, 0.1 mm to 0.2 mm, 0.1 mm to 0.5 mm, 0.1 mm to 1 mm, 0.5 mm to 1 mm, 0.5 mm to 2 mm, or 1 mm to 2 mm. The bridge segment 506 can have a width (not visible in FIG. 5A) that is greater than, equal to, or less than the width of the substrate 400a. The width of the bridge segment 506 can be less than or equal to 20 cm, 10 cm, 5 cm, 2 cm, or 1 cm; greater than or equal to 0.5 cm, 1 cm, 2 cm, 5 cm, or 10 cm; and/or within a range from 1 cm to 20 cm, 1 cm to 10 cm, or 10 cm to 20 cm.

The bridge segment 506 can be partially or fully transparent to the energy wavelength(s) for curing the curable material. In some embodiments, the material(s) of the bridge segment 506 exhibit a transmittance of at least 50%, 60%, 70%, 75%, 80%, 85%, 90%, 95%, 99%, or 99.9% for the energy wavelength(s). Optionally, the material(s) of the bridge segment 506 can have the same or similar refractive indices as the other materials of the substrate 400a (e.g., the difference in refractive indices can be within a range from 0.1 to 0.3, and/or the refractive index contrast can be no more than 0.05, 0.01, or 0.005).

Figure 5B:
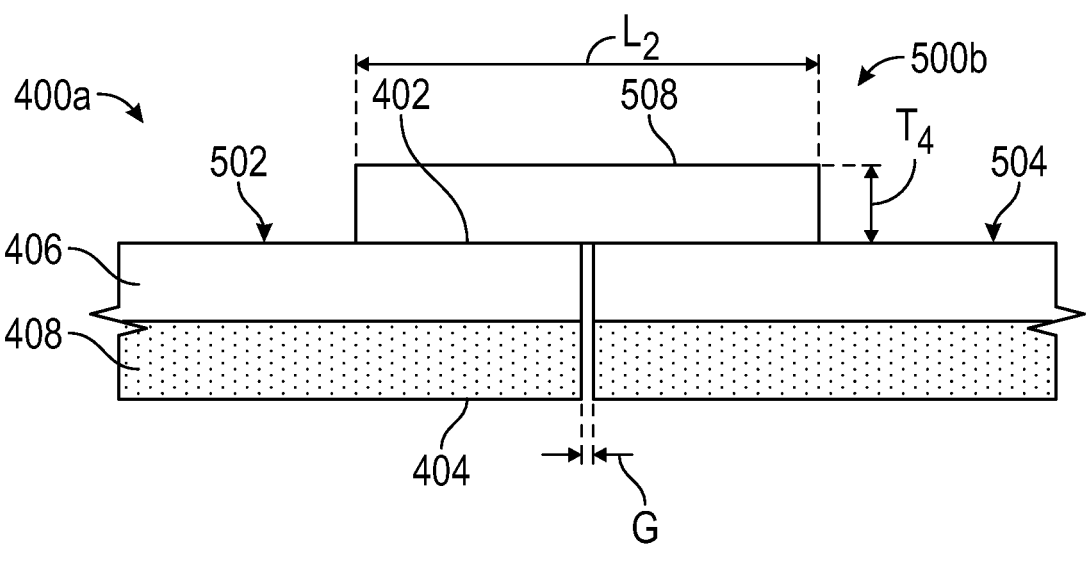
FIG. 5B is a partially schematic side view of a connection region of a multilayered substrate, in accordance with embodiments of the present technology.

FIG. 5B is a partially schematic side view of a connection region 500b of the substrate 400a, in accordance with embodiments of the present technology. The connection region 500b can be generally similar to the connection region 500a of FIG. 5A, except that the first end portion 502 and the second end portion 504 of the substrate 400a are coupled to each other by a bridge segment 508 at the first surface 402 of the substrate 400a.

The bridge segment 508 can be a short section of material (e.g., a tape, strip, sheet, film) that is coupled to the first surface 402 of the substrate 400a to connect the first end portion 502 to the second end portion 504. For example, the bridge segment 506 can be coupled to the first layer 406 of the substrate 400a using welding (e.g., laser welding, solvent welding), bonding, laminating, adhesives, fasteners, and/or other suitable attachment techniques. Optionally, the first surface 402 can be pretreated to improve adhesion to the bridge segment 508 (e.g., via corona treatment and/or other surface modification techniques).

The bridge segment 508 can be made out of the same material(s) as the first layer 406, which can be advantageous for creating a smooth, seamless connection between the first layer 406 and the bridge segment 508. Alternatively, the bridge segment 508 can be made out of a different material than the first layer 406, but can have similar properties as the first material(s) of the first layer 406 (e.g., similar surface energy, similar polarity/nonpolarity, similar hydrophobicity/hydrophilicity, similar oleophobicity/oleophilicity). The use of the same or similar material(s) in the bridge segment 508 and first layer 406 can facilitate creation of a smooth and durable connection between the first end portion 502 and the second end portion 504 of the substrate 400a. In some embodiments, the bridge segment 508 is or includes a fluorinated material, such as a fluoropolymer (e.g., FEP, PTFE, ETFE, PFA, PCDF, ECTFE, PFCA, PMVE, PFSA, PFPE). Alternatively or in combination, the bridge segment 508 can be or include a siloxane or a polysiloxane (e.g., a PDMS derivative), or a silane or a polysilane.

Although the bridge segment 508 is illustrated as having a single layer, in other embodiments, the bridge segment 508 can include multiple layers, some or all of which can be composed of different materials and/or have different properties. In embodiments where the bridge segment 508 is composed of multiple layers, the layer closest to the first surface 402 can be made out of the same or similar materials as the first layer 406. The other layers of the bridge segment 508 can also be made out of the same or similar materials as the first layer 406, or can be made out of materials having different properties than the first layer 406.

The dimensions of the bridge segment 508 can be varied as desired. For example, the bridge segment 508 can have a length $L_2$ that is shorter than the length of the substrate 400a, but sufficiently long to span the connection region 500b, and adhere securely to both the first end portion 502 and the second end portion 504. The length $L_2$ can be less than or equal to 10 cm, 5 cm, 4 cm, 3 cm, 2 cm, 1 cm; and/or greater than or equal to 0.5 cm, 1 cm, 2 cm, 3 cm, 4 cm, or 5 cm. In embodiments where the first end portion 502 and the second end portion 504 are spaced apart by a gap distance G, the length $L_2$ can be greater than the gap distance G.

The bridge segment 508 can have a thickness $T_4$, which can be greater than, equal to, or less than the thickness of the first layer 406. For instance, the thickness $T_4$ can be at least 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1 mm, 1.25 mm, 1.5 mm, 1.75 mm, or 2 mm; and/or no more than 2 mm, 1.75 mm, 1.5 mm, 1.25 mm, 1 mm, 0.9 mm, 0.8 mm, 0.7 mm, 0.6 mm, 0.5 mm, 0.4 mm, 0.3 mm, 0.2 mm, 0.1 mm, or 0.05 mm; and/or within a range from 0.01 mm to 0.05 mm, 0.05 mm to 0.1 mm, 0.1 mm to 0.2 mm, 0.1 mm to 0.5 mm, 0.1 mm to 1 mm, 0.5 mm to 1 mm, 0.5 mm to 2 mm, or 1 mm to 2 mm. The bridge segment 508 can have a width (not visible in FIG. 5B) that is greater than, equal to, or less than the width of the substrate 400a. The width of the bridge segment 508 can be less than or equal to 20 cm, 10 cm, 5 cm, 2 cm, or 1 cm; greater than or equal to 0.5 cm, 1 cm, 2 cm, 5 cm, or 10 cm; and/or within a range from 1 cm to 20 cm, 1 cm to 10 cm, or 10 cm to 20 cm.

The bridge segment 508 can be partially or fully transparent to the energy wavelength(s) for curing the curable material. In some embodiments, the material(s) of the bridge segment 508 exhibit a transmittance of at least 50%, 60%, 70%, 75%, 80%, 85%, 90%, 95%, 99%, or 99.9% for the energy wavelength(s). Optionally, the material(s) of the bridge segment 508 can have the same or similar refractive indices as the other materials of the substrate 400a (e.g., the difference in refractive indices can be within a range from 0.1 to 0.3, and/or the refractive index contrast can be no more than 0.05, 0.01, or 0.005).

Optionally, the bridge segment 506 of FIG. 5A can be used in combination with the bridge segment 508 of FIG. 5B, such that the first end portion 502 and second end portion 504 of the substrate 400a are coupled to each other by the bridge segment 506 at the second surface 404, and by the bridge segment 508 at the first surface 402. This approach can further reinforce the connection between the first end portion 502 and the second end portion 504.

Figure 5C:
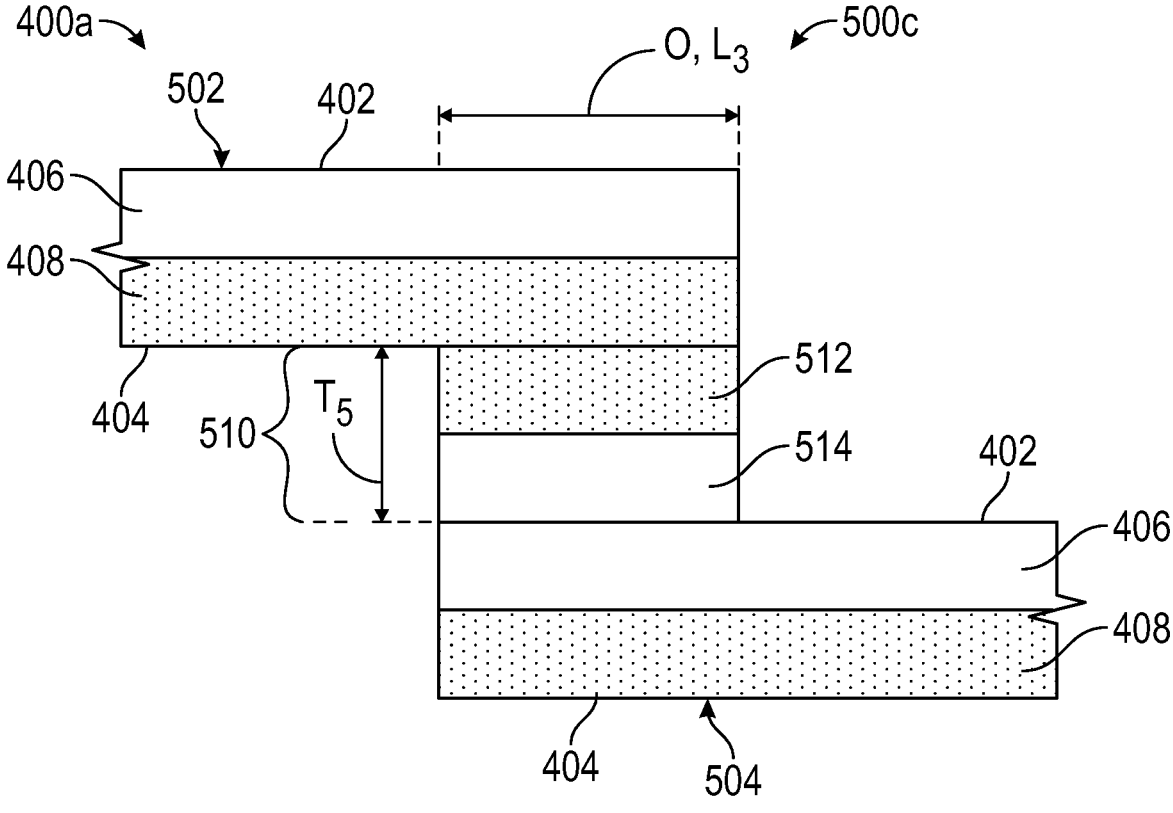
FIG. 5C is a partially schematic side view of a connection region of a multilayered substrate, in accordance with embodiments of the present technology.

FIG. 5C is a partially schematic side view of a connection region 500c of the substrate 400a, in accordance with embodiments of the present technology. In the illustrated embodiment, the first end portion 502 of the substrate 400a is coupled to the second end portion 504 of the substrate

400a via a bridge segment 510 positioned vertically between the first end portion 502 and the second end portion 504. The bridge segment 510 can be a short section of material (e.g., a tape, strip, sheet, film) that is coupled to the second surface 404 of the first end portion 502 and to the first surface 402 of the second end portion 504. For example, the bridge segment 510 can be coupled to the second layer 408 of the first end portion 502, and to the first layer 406 of the second end portion 504, using welding (e.g., laser welding, solvent welding), bonding, laminating, adhesives, fasteners, and/or other suitable attachment techniques. Optionally, the second surface 404 of the first end portion 502 and/or the first surface 402 of the second end portion 504 can be pretreated to improve adhesion to the bridge segment 510 (e.g., via corona treatment and/or other surface modification techniques).

The bridge segment 510 can include a first layer ("first bridge layer 512") that connects to the second layer 408 of the first end portion 502, and a second layer ("second bridge layer 514") that connects to the first layer 406 of the second end portion 504. The first bridge layer 512 can be made out of the same material(s) as the second layer 408, or can be made out of a different material that has similar properties as the second layer 408. In some embodiments, the first bridge layer 512 is or includes a polymeric material, such as a polysiloxane (e.g., PDMS), a polyester (e.g., PET, PETG), a polycarbonate, a polyacrylate (e.g., PMMA), a polyimide (e.g., Kapton), a polyurethane, a polysulfone, PVC, COC, PE, PP, SMMA, SAN, ABS, or a combination thereof. The second bridge layer 514 can be made out of the same material(s) as the first layer 406, or can be made out of a different material that has similar properties as the first layer 406. In some embodiments, the second bridge layer 514 is or includes a fluorinated material, such as a fluoropolymer (e.g., FEP, PTFE, ETFE, PFA, PCDF, ECTFE, PFCA, PMVE, PFSA, PFPE); a siloxane or a polysiloxane (e.g., a PDMS derivative); or a silane or a polysilane.

Optionally, the bridge segment 510 can include one or more additional layers between the first bridge layer 512 and the second bridge layer 514. The additional layer(s) can be made out of any suitable materials, such as the same or similar materials as the first bridge layer 512; the same or similar materials as the second bridge layer 514; materials having different properties than the first bridge layer 512 and/or the second bridge layer 514; and so on.

In the illustrated embodiment, the first end portion 502 and the second end portion 504 laterally overlap each other by an overlap distance O. The overlap distance O can be any suitable size, such as no more than 5 cm, 2.5 cm, 2 cm, 1.5 cm, 1.25 cm, 1 cm, or 0.5 cm; and/or at least 0.25 cm, 0.5 cm, 1 cm, 1.25 cm, 1.5 cm, 2 cm, or 2.5 cm. In other embodiments, the first end portion 502 can be laterally aligned with the second end portion 504 such that the overlap distance O is zero. Optionally, the first end portion 502 can be laterally spaced apart from the second end portion 504 by a gap distance, such as a gap distance of no more than 1 cm, 0.5 cm, 0.25 cm, or 0.1 cm; and/or at least 0.01 cm, 0.1 cm, 0.25 cm, or 0.5 cm.

The dimensions of the bridge segment 510 can be varied as desired. For example, the bridge segment 510 can have a length $L_3$ that is shorter than the length of the substrate 400a, but sufficiently long to span the connection region 500c, and adhere securely to both the first end portion 502 and the second end portion 504. The length $L_3$ can be less than or equal to 10 cm, 5 cm, 4 cm, 3 cm, 2 cm, 1 cm; and/or greater than or equal to 0.5 cm, 1 cm, 2 cm, 3 cm, 4 cm, or 5 cm. Although the length $L_3$ is illustrated as being the same as the overlap distance O, the length $L_3$ can alternatively be greater or less than the overlap distance O. In embodiments where the first end portion 502 and the second end portion 504 are spaced apart by a gap distance, the length $L_3$ can be greater than the gap distance.

The bridge segment 510 can have a thickness $T_5$, which can be at least 0.0025 mm, 0.005 mm, 0.0075 mm, 0.01 mm, 0.025 mm, 0.05 mm, 0.075 mm, 0.1 mm, 0.5 mm, or 1 mm; and/or no more than 2 mm, 1 mm, 0.5 mm, 0.1 mm, 0.075 mm, 0.05 mm, 0.025 mm, 0.01 mm, 0.0075 mm, or 0.005 mm; and/or within a range from 0.0025 mm to 0.5 mm, 0.0025 mm to 0.05 mm, or 0.0025 mm to 0.01 mm. The individual layers of the bridge segment 510 (e.g., the first bridge layer 512 and the second bridge layer 514) can each independently have any suitable thickness, such as a thickness of at least 0.0025 mm, 0.005 mm, 0.0075 mm, 0.01 mm, 0.025 mm, 0.05 mm, 0.075 mm, 0.1 mm; and/or no more than 0.1 mm, 0.075 mm, 0.05 mm, 0.025 mm, 0.01 mm, 0.0075 mm, or 0.005 mm. The individual layers of the bridge segment 510 can have the same thickness, or can have different thicknesses (e.g., the thickness of the first bridge layer 512 can be less than, equal to, or greater than the thickness of the second bridge layer 514).

The bridge segment 510 can have a width (not visible in FIG. 5C) that is greater than, equal to, or less than the width of the substrate 400a. The width of the bridge segment 510 can be less than or equal to 20 cm, 10 cm, 5 cm, 2 cm, or 1 cm; greater than or equal to 0.5 cm, 1 cm, 2 cm, 5 cm, or 10 cm; and/or within a range from 1 cm to 20 cm, 1 cm to 10 cm, or 10 cm to 20 cm.

The bridge segment 510 can be partially or fully transparent to the energy wavelength(s) for curing the curable material. In some embodiments, the material(s) of the bridge segment 510 exhibit a transmittance of at least 50%, 60%, 70%, 75%, 80%, 85%, 90%, 95%, 99%, or 99.9% for the energy wavelength(s). Optionally, the material(s) of the bridge segment 510 can have the same or similar refractive indices as the other materials of the substrate 400a (e.g., the difference in refractive indices can be within a range from 0.1 to 0.3, and/or the refractive index contrast can be no more than 0.05, 0.01, or 0.005).

Although the embodiments of FIGS. 5A-5C are shown and described with respect to the substrate 400a of FIG. 4A, the techniques of FIGS. 5A-5C can also be applied to any of the other embodiments of substrates described herein (e.g., the embodiments of FIGS. 4B-4D). In such embodiments, the material(s) of the bridge segment can be modified, depending on the material(s) at the surface(s) of the substrate to which the bridge segment is coupled.

The present technology provides other techniques to connect the ends of a substrate to form a loop, as an alternative to or in combination with the techniques of FIGS. 5A-5C. For example, the ends of a substrate can be connected to each other in an end-to-end manner in which the vertical surface of one end is coupled to the vertical surface of the other end without requiring a bridge segment, e.g., using welding (e.g., laser welding, solvent welding), bonding, laminating, adhesives, fasteners, and/or other suitable attachment techniques. In such embodiments, the end surfaces can be pretreated to improve adhesion to each other. In some embodiments, an end-to-end coupling is used for a substrate in which one layer is a thin coating that is applied onto another layer (e.g., the first layer 406 of the substrate 400a of FIG. 4A may be a coating of silicone oil and the second layer 408 of the substrate 400a may be a PET film that supports the coating).

B. Self-Healing Substrates

In some embodiments, the substrates of the present technology include self-healing capabilities. Self-healing can be beneficial if the curable material includes components that can scratch, abrade, pierce, tear, degrade, or otherwise damage the substrate. For example, the curable material can include hard fillers (e.g., glass, ceramics) that increase the mechanical strength and/or scratch resistance of the printed object, but can also damage the surface of the substrate. Damage can also occur due to contact between the substrate and components of the printer assembly (e.g., blades, rollers), as well as thermomechanical stresses placed on the substrate. Over time, accumulated damage to the substrate can increase the surface roughness of the substrate, which can lead to issues such as reduced energy transmission through the substrate (e.g., due to scattering), increasing adhesion of the curable material and/or cured material, etc. Conventionally, a damaged substrate is replaced with a new substrate, which leads to manufacturing down time, and increases costs and resource usage. To overcome these and other challenges, the substrates herein can incorporate one or more self-healing materials that are able to repair damage such as abrasions, cracks, cuts, tears, etc.

Figure 6A:
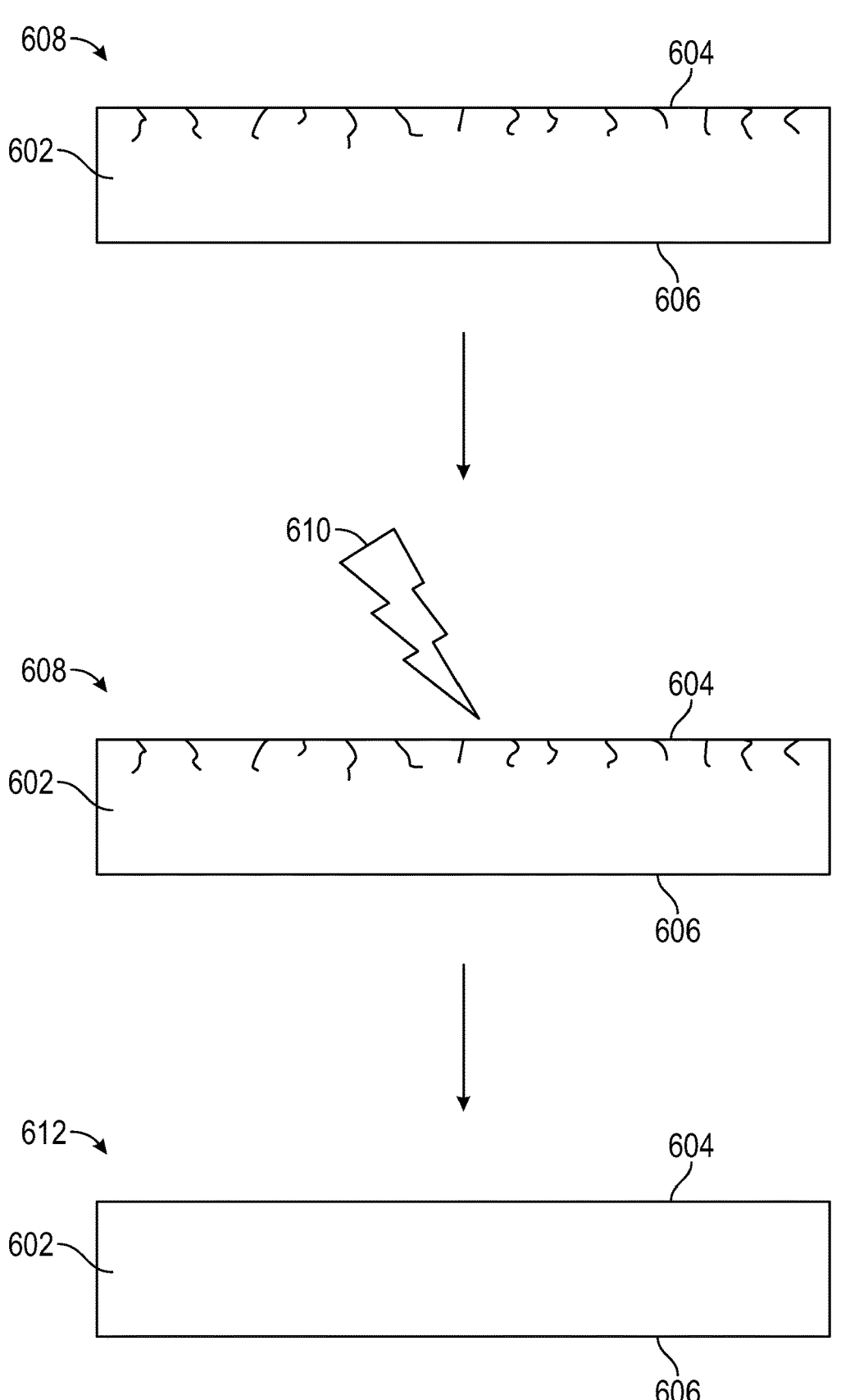
FIG. 6A is a partially schematic diagram providing a general overview of a process for repairing a substrate, in accordance with embodiments of the present technology.

FIG. 6A is a partially schematic diagram providing a general overview of a process for repairing a substrate 602, in accordance with embodiments of the present technology. The substrate 602 can be used as a carrier film, a window, or any other component of an additive manufacturing system that interfaces with a curable material, as described herein. The substrate 602 can include any of the substrate features described herein. For example, although the substrate 602 is illustrated as being a monolithic component having a single layer, the substrate 602 can alternatively include a plurality of layers (e.g., as described in Section II.A).

The substrate 602 includes a first surface 604 (e.g., an upper surface) and a second surface 606 opposite the first surface 604 (e.g., a lower surface). The first surface 604 can be oriented toward a curable material for forming an additively manufactured object (e.g., a polymerizable resin—not shown). In some embodiments, the first surface 604 is configured to directly contact the curable material, while in other embodiments, the first surface 604 can be separated from the curable material via an interfacial material, as described in detail in Section II.C below. The second surface 606 can be oriented toward an energy source that provides energy to cure the curable material (e.g., a projector or light engine—not shown).

The substrate 602 can include at least one self-healing material. In embodiments where the substrate is a single layer material, the entire substrate can be made partially or entirely out of a self-healing material. In embodiments where the substrate includes multiple layers, the self-healing material can be incorporated into some or all of the layers of the substrate. For example, the self-healing material can be incorporated into the layer that is closest to and/or in direct contact with the curable material (e.g., the first layer 406 of the substrates 400a-400d of FIGS. 4A-4D), the layer that is closest to and/or in direct with a component of the printer assembly (e.g., the second layer 408 of FIGS. 4A and 4B, the third layer 414 of FIG. 4C, the additional layer 418b of FIG. 4D), and/or any other layer that is susceptible to damage during the additive manufacturing process.

During operation, contact between the substrate 602 and the curable material (e.g., hard fillers within the curable material), contact between the substrate 602 and the components of the printer assembly, and/or thermomechanical stresses applied to the substrate 602 can result in the substrate 602 being in a damaged condition 608 in which damage (e.g., scratches, cracks, tears, perforations, abrasions) is present in at least one surface of the substrate 602 (e.g., the first surface 604). In the damaged condition 608, the surface of the substrate 602 can become roughened, which can affect the optical properties of the substrate 602 and/or increase the forces to release the cured material from the surface.

In some embodiments, the self-healing capabilities of the substrate 602 are triggered by applying energy 610 to the substrate 602, such as electromagnetic energy (e.g., IR light, visible light, UV light, microwaves), acoustic energy (e.g., ultrasonic waves), radiation energy (e.g., alpha radiation, beta radiation, neutron radiation), direct contact with a heat source, etc. The energy 610 can be targeted to the surface of the substrate 602 exhibiting damage (e.g., the first surface 604), or can be uniformly applied to the substrate 602 as a whole.

The application of the energy 610 can trigger a repair process in the substrate 602 that causes the self-healing material of the substrate 602 to partially or fully repair the damage. For example, the energy 610 can trigger physical repair processes (e.g., interdiffusion of polymer chains, introduction of phase-separated morphologies, shape-memory effects, and/or the introduction of superparamagnetic nanoparticles), chemical repair processes (e.g., introduction of covalent, free radical, and/or supramolecular dynamic bonds), physicochemical repair processes (e.g., enhanced van der Waals forces; release of reactive species), or combinations thereof. In some embodiments, the repair process causes components of the self-healing material to diffuse into and fill openings resulting from damage (e.g., cracks, pores, gaps). The components can form physical and/or chemical bonds with the surrounding material of the substrate 602.

In some embodiments, the energy 610 provided to the self-healing material of the substrate 602 causes the material to flow and level to repair the damage. In materials with very high viscosity, the flow and leveling process may take a long time. As such, the surface of the substrate 602 can be placed against rollers, plates, or other mechanical fixtures that apply pressure to the substrate 602 to increase the flow rate and/or reshape the self-healing material as desired.

After activation of the self-healing material, the substrate 602 can return to a repaired condition 612 in which little or no damage remains on the surface of the substrate 602. In the repaired condition 612, the surface of the substrate 602 can be sufficiently smooth to provide efficient transmission of curing energy through the substrate 602 and/or allow for facile release of cured material from the surface.

Many different types of self-healing materials can be used in the substrates described herein, such as self-healing polymers (e.g., a polymer matrix with self-healing capabilities) and/or self-healing polymer composites (e.g., self-healing agents embedded in particles, capsules, tubes, fibers, vascular networks, etc., within a polymer matrix). For example, the self-healing material can be or include a crosslinked network (e.g., a dynamic covalent network), and the formation of bonds within the network can drive the self-healing process. The crosslinked network can include various covalent self-healing mechanisms, such as mechanisms based on disulfide bonds, Diels-Alder chemistry, imine bonds, diselenide bonds, boron-based bonds, transesterification reactions, ditelluride bonds, and others. The self-healing process can be activated by heat (e.g., Diels-Alder chemistry), light, and/or other stimuli. Self-healing materials based on crosslinked networks can be used as an individual layer or surface coating of a substrate, or can be used to form the entire bulk material of the substrate. Examples of self-healing materials based on crosslinked networks include polymers forming dynamic covalent bonds, such as aromatic disulfides, polyacetals that undergo bond exchange in the presence of acid and heat, borate materials, etc.

In some embodiments, the self-healing material is a thermoplastic material, such that the repair process is activated by applying heat to the substrate. When heated, the thermoplastic material can flow and/or level to fill in any damage to the substrate, thus reforming a smooth surface. Examples of self-healing thermoplastic materials include polymers incorporating Diels-Alder chemistry, polymers forming dynamic covalent bonds such as aromatic disulfides, and plasticized thermoplastics.

In some embodiments, the self-healing material is a highly viscous gel, a lightly crosslinked polymer, and/or a highly plasticized, lightly crosslinked polymer, such as plasticized PDMS or plasticized fluoropolymers. The plasticizer can be a low molecular weight oligomer that has the same or similar surface energy as the self-healing material so as to be completely soluble in the self-healing material. The lightly crosslinked, self-healing material can be coupled to a support layer which provides enhanced mechanical strength and/or heat resistance, as described herein. Damage to the self-healing material can cause the self-healing material to flow and/or level to lessen the surface energy, which can be accelerated by the application of energy.

In embodiments where the self-healing material forms part or all of a surface of the substrate that contacts the curable material, the self-healing material can be configured to inhibit adhesion to the curable material and/or cured material, e.g., similar to the separation layer described in Section II.A. For example, the self-healing material can have a low surface energy, such as a surface energy less than or equal to 50 dynes/cm, 40 dynes/cm, 38 dynes/cm, 36 dynes/cm, 34 dynes/cm, 32 dynes/cm, 30 dynes/cm, 28 dynes/cm, 26 dynes/cm, 24 dynes/cm, 22 dynes/cm, 20 dynes/cm, 18 dynes/cm, 16 dynes/cm, 14 dynes/cm, 12 dynes/cm, or 10 dynes/cm; and/or within a range from 10 dynes/cm to 40 dynes/cm, or 18 dynes/cm to 36 dynes/cm. Such self-healing materials can be or include low surface energy components such as PDMS derivatives, silanes, polysilanes, and/or fluorinated materials (e.g., fluoropolymers such as FEP). Alternatively or in combination, the self-healing material can have high oxygen solubility and/or permeability to inhibit polymerization at the interface between the self-healing material and the curable material. Examples of self-healing materials that resist adhesion include plasticized versions of the above materials, versions of the above materials that form dynamic covalent networks, versions of the above materials that cyclodimerize, etc.

The self-healing material can be partially or fully transparent to the energy wavelength(s) for curing the curable material. In some embodiments, the self-healing material exhibits a transmittance of at least 50%, 60%, 70%, 75%, 80%, 85%, 90%, 95%, 99%, or 99.9% for the energy wavelength(s). Optionally, the self-healing material can have the same or similar refractive indices as the material of the substrate (e.g., the difference in refractive indices can be within a range from 0.1 to 0.3, and/or the refractive index contrast can be no more than 0.05, 0.01, or 0.005).

Figure 6B:
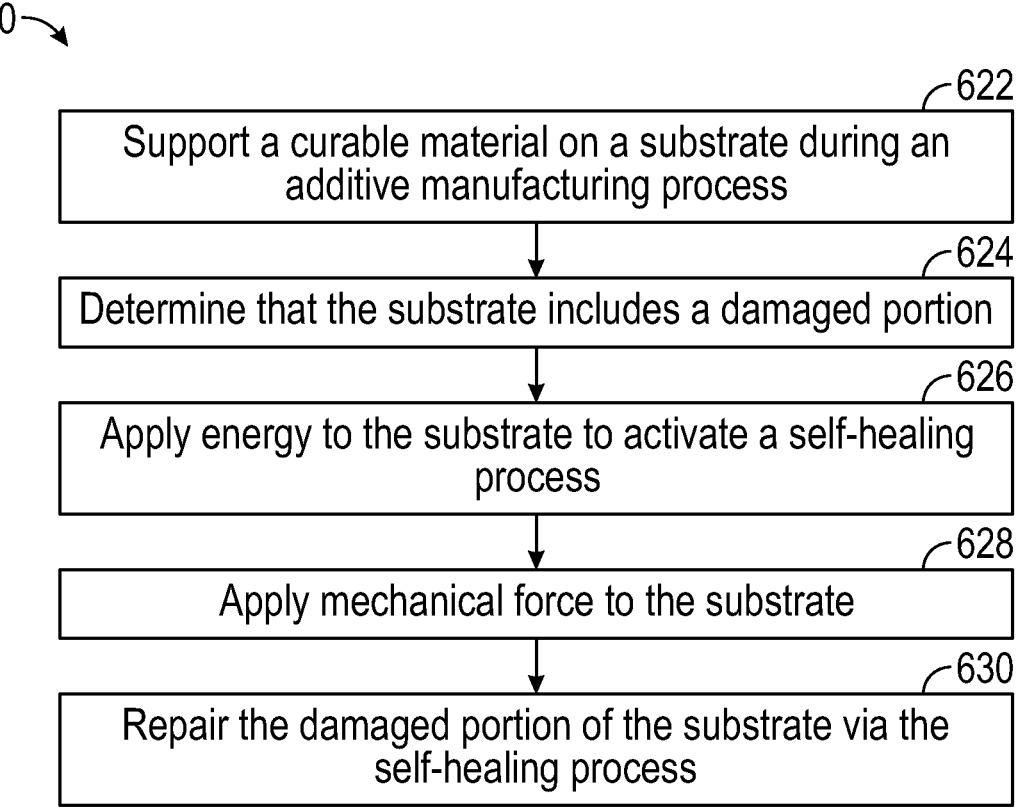
FIG. 6B is a flow diagram illustrating a method for repairing a substrate, in accordance with embodiments of the present technology.

FIG. 6B is a flow diagram illustrating a method 620 for repairing a substrate, in accordance with embodiments of the present technology. The method 620 can be performed by any embodiment of the systems and devices described herein, such as the system 200 of FIG. 2 or the system 300 of FIG. 3. In some embodiments, some or all of the processes of the method 400 are implemented as computer-readable instructions (e.g., program code) that are configured to be executed by one or more processors of a computing device, such a controller of an additive manufacturing system (e.g., the controller 334 of FIG. 3).

The method 620 can begin at block 622 with supporting a curable material on a substrate during an additive manufacturing process. The additive manufacturing process can be used to fabricate one or more objects from the curable material, as described herein. As previously discussed, the substrate can be a carrier film, window, etc., that is interposed between the curable material and an energy source of a printer assembly that implements the additive manufacturing process. The substrate can be partially or completely formed from at least one self-healing material, e.g., the self-healing material can be localized to a surface layer that contacts the curable material, or the entirety of the substrate can be made from the self-healing material. The self-healing material can be any of the embodiments provided herein.

At block 624, the method 620 can include determining that the substrate includes a damaged portion. The damaged portion can be a surface of the substrate, such as a surface that is closest to and/or in contact with the curable material, a surface that is in contact with a component of the printer assembly, etc. Alternatively or in combination, the damaged portion be an interior portion of the substrate. The damaged portion can include scratches, cracks, tears, perforations, abrasions, and/or any other types of damage that may result from contact with the curable material (e.g., due to the presence of abrasive agents within the curable material), contact with the components of the printer assembly, thermomechanical stresses, etc.

In some embodiments, the determination is performed based on sensor data from one or more sensors. The sensor data can characterize a state of the substrate, such as surface characteristics (e.g., roughness, adhesiveness), optical characteristics (e.g., scatter, reflectance, transmittance), appearance (e.g., whether there is any visible damage), etc. Alternatively or in combination, the sensor data can measure the amount of force to release the cured material from the substrate. Examples of sensors that can be used include, but are not limited to, imaging devices (e.g., cameras, scanners), optical sensors (e.g., spectrophotometers, scanned lasers and/or laser grids, light projectors), acoustic sensors (e.g., ultrasonic sensors), distance sensors, and force sensors. The sensor data can be obtained continuously or can be obtained at predetermined intervals (e.g., after printing each layer of the object, after printing x layers of the object, after each printing operation, after x number of printing operations, after x amount of time).

The process of block 624 can include analyzing the sensor data to determine whether there is any damage to the substrate, and, optionally, the extent and/or location of the damage. For example, significant changes in surface roughness and/or optical properties (e.g., decrease in transmittance, increase in scatter and/or reflectivity) relative to baseline and/or a predetermined threshold can indicate that the substrate is damaged. As another example, image data of the substrate can be processed (e.g., using computer vision algorithms and/or machine learning algorithms) to detect the presence of damage. In a further example, an increase in the amount of force to release the cured material relative to baseline and/or a predetermined threshold can indicate that the cured material is sticking to the substrate, which can be caused by damage to the substrate as described herein. In yet another example, acoustic data can indicate the presence of damage, e.g., the sounds produced when scraping curable material off the substrate can correlate to adhesiveness of the substrate, which in turn can indicate the presence of damage; ultrasonic testing can be used to measure changes in physical properties of the substrate that can correlate to damage, etc.

At block 626, the method 620 can continue with applying energy to the substrate to activate a self-healing process. The energy can activate the self-healing material of the substrate in accordance with any of the mechanisms described herein (e.g., covalent processes, physical processes, physicochemical processes, etc.). The energy can be any suitable energy type, such as light energy, heat energy, acoustic energy, radiation energy, etc. In some embodiments, the energy is the same type of energy used in the additive manufacturing process to heat and/or cure the curable material, and/or the energy is applied by the same devices (e.g., light engine, projector, heat source) used for curable material. In other embodiments, the energy can be a different type of energy, and/or can be applied by a different device than those used for the curable material.

In some embodiments, the energy is applied while the substrate remains in place in the printer assembly, and the curable material is still present on the substrate. In such embodiments, the self-healing material of the substrate can be configured such that the curable material has little or no solubility in the self-healing material, to reduce the interactions between the curable material and the self-healing material. For example, if the curable material is hydrophilic, the self-healing material can be hydrophobic; if the curable material is hydrophobic, the self-healing material can be oleophobic and/or hydrophilic; etc. The curable material can be insoluble in the self-healing material across the temperature range used for the additive manufacturing and self-healing processes, such that self-healing can occur while the substrate is in contact with the curable material, with little or no risk of the curable material diffusing into the substrate. Moreover, in embodiments where self-healing occurs while the curable material is still present on the substrate, the energy used to activate self-healing can be different from the energy that cures the curable material. Additionally, the energy used to activate self-healing can be selected to avoid degrading the curable material.

In some embodiments, the energy is applied while the substrate remains in place in the printer assembly, but the curable material is removed before the self-healing process if activated. The curable material can be removed by scraping the material off from the substrate using a blade, pouring the curable material off the substrate, or any other suitable removal mechanism. The energy can then be applied to the substrate to activate self-healing. For example, referring to the system 300 of FIG. 3, the carrier film 310 can incorporate a self-healing material as described herein. In such embodiments, the curable material 306 can be removed from the carrier film 310 using one or more blades present in the printer assembly 302 (e.g., the blade 320; a blade at the pre-print zone 322, print zone 324, and/or post-print zone 336). Energy can then be applied to the exposed carrier film 310, e.g., using one or more heat sources, energy sources, etc., that are in contact with or proximate to the carrier film 310.

Optionally, the substrate can be removed from the printer assembly and placed in a separate device that applies the energy to activate the self-healing process. In such embodiments, the substrate can be removed and cleaned before the energy is applied, e.g., manually by a human operator, automatically by a robotic assembly, or suitable combinations thereof.

In some embodiments, the energy in block 626 is selectively applied to the damaged portion of the substrate (e.g., to the damaged surface only). This approach can be advantageous in embodiments where the entire substrate is made from the self-healing material to avoid unwanted changes in the geometry (e.g., shape, thickness) that may otherwise occur as the self-healing material flows to repair the substrate. For example, the damaged portion can be selectively exposed to energy, such as by placing the damaged portion against a heated component (e.g., a heated plate), directing heated air or fluid against the damaged portion, and/or targeting energy (e.g., IR, UV, or visible light) to the damaged portion. Accordingly, only the damaged portion will receive sufficient energy to flow, while the rest of substrate can remain substantially unaffected.

Optionally, the remaining portions of the substrate can be insulated from the energy, such as by masking or covering the other portions of the substrate, and/or by cooling the other portions of the substrate (e.g., by placing a cooled component such as a cold plate against the other portions, directing cooled air of fluid against the other portions). For instance, targeted heating and/or cooling can produce a temperature gradient in the substrate such that the damaged portion exhibits sufficiently high temperature for the self-healing material to flow and repair the damage, while the other portions of the substrate exhibit lower temperatures that do not cause activation of the self-healing material.

In other embodiments, however, the energy in block 626 can be applied to other portions of the substrate besides the damaged portion, or can be applied to the entire substrate. This approach can be used in embodiments where the self-healing material is localized to the damaged portion of the substrate (e.g., the self-healing material is in the upper layer of the substrate only), and/or in embodiments where mechanical forces are applied to maintain the original shape of the substrate, as described below.

At block 628, the method 620 can optionally include applying a mechanical force to the substrate. The mechanical force can be applied before, concurrently with, and/or after the energy is applied in block 626. The mechanical forces can be applied to the substrate to maintain the substrate in a desired geometry (e.g., shape, thickness and/or other dimensions), e.g., in embodiments where the entire substrate is made from a flowable self-healing material that might otherwise change in shape and/or size. The pressure provided by the mechanical forces can also accelerate self-healing by increasing the flow rate of the self-healing material into the damaged portion. The mechanical force can be applied by rollers, presses, plates, molds, or any other suitable mechanism having a surface that can exert pressure onto the substrate. Optionally, the mechanism can also provide the energy to activate self-healing (e.g., the roller, press, plate, mold, etc., can be heated). The mechanical force can be applied selectively to the damaged portion of the substrate (e.g., to the damaged surface only), or can be applied to other portions of the substrate.

At block 630, the method 620 can include repairing the damaged portion of the substrate via the self-healing process provided by the self-healing material of the substrate. The process of block 630 can occur concurrently with and/or after the processes of blocks 626 and/or 628. Subsequently, the method 620 can include resuming the additive manufacturing operation, such as by replacing the substrate in the printer assembly and/or reapplying the curable material to the substrate, if appropriate.

The method 620 can be modified in many different ways. For example, some of the processes of the method 620 can be omitted, such as the processes of blocks 624 and/or 628. In some embodiments, rather than checking for a damaged portion in block 624, the method 620 can simply involve applying energy to initiate the self-healing process at pre-determined intervals (e.g., after printing each layer of the object, after printing x layers of the object, after each printing operation, after x number of printing operations, after x amount of time). Optionally, self-healing can be performed continuously during the printing operation, such as if the self-healing material is activated by the energy used to cure the curable material, by the temperature at which additive manufacturing occurs (e.g., room temperature or an elevated temperature, etc.).

Moreover, the method 620 can include other processes not shown in FIG. 6B. For example, the method 620 can further include determining whether the damaged portion is repair-able via the self-healing process, e.g., by evaluating the type, location, and/or severity of the damage. If the damaged portion is not repairable, the method 620 can output a notification alerting a human operator that manual interven-tion is needed. The method 620 can also include assessing whether the damaged portion was successfully repaired, e.g., using sensor data from one or more sensors. If the repair was unsuccessful, the processes of blocks 626-628 can be repeated to reattempt the repair. Optionally, the method 620 can alert an operator after one or more failed attempts to repair the substrate.

C. Interfacial Materials for Additive Manufacturing

In some embodiments, the present technology provides an interfacial material that inhibits adhesion to the substrate of an additive manufacturing system. The interfacial material can be a liquid located at the interface between the substrate and the curable material, such that the substrate does not directly contact the curable material. This approach can prevent adhesion due to physical contact, as well as prevent the curable material from forming covalent bonds with the substrate, thus reducing the forces needed to release cured material from the substrate. Moreover, the presence of the interfacial material can protect the substrate from damage due to contact with the curable material, particularly if the curable material includes hard fillers or other abrasive agents, which can extend the lifetime of the substrate.

Figures 7A, 7B, 7C:
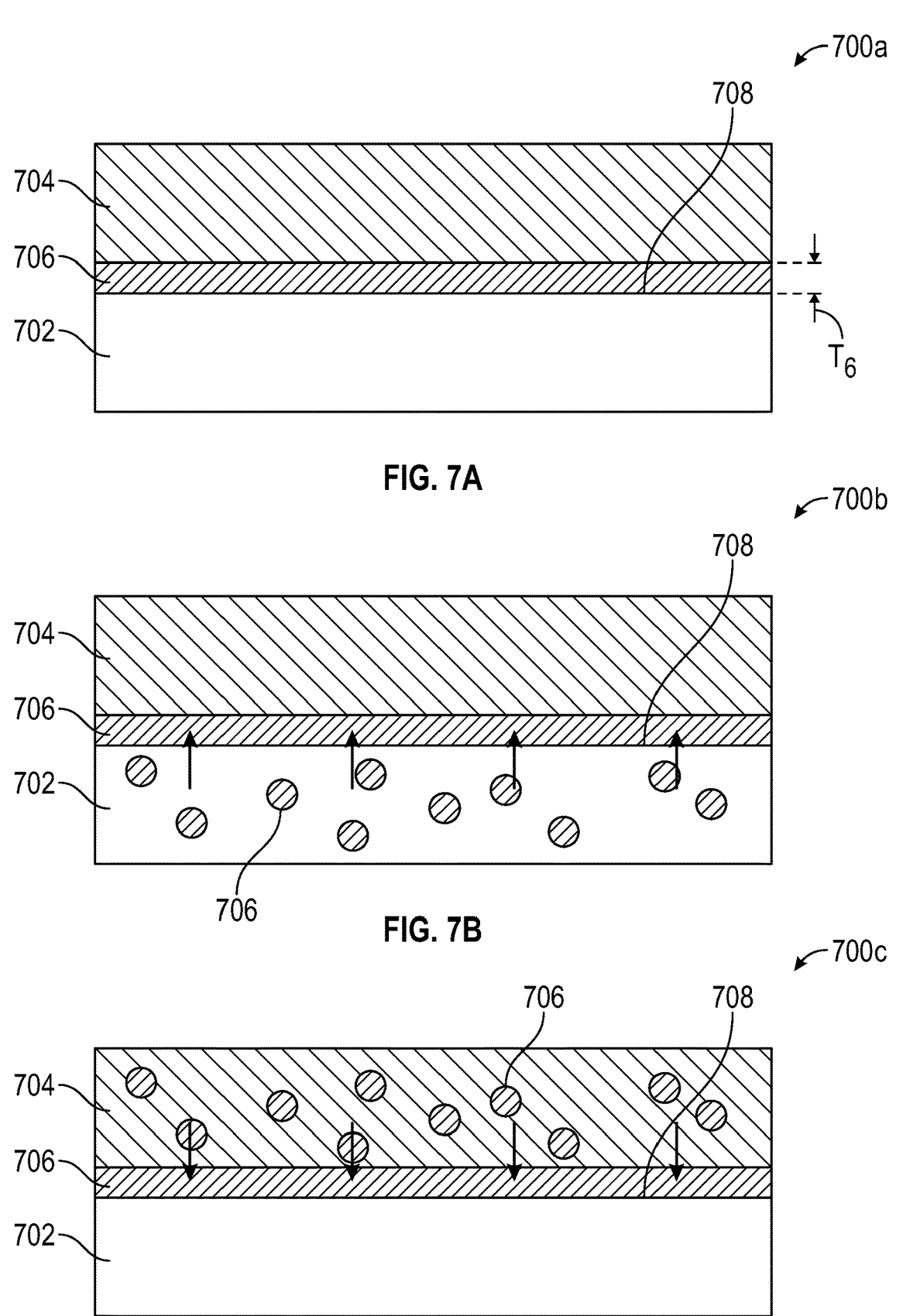
FIG. 7A is a partially schematic illustration of a system for additive manufacturing including an interfacial material configured in accordance with embodiments of the present technology.
FIG. 7B is a partially schematic illustration showing replenishment of an interfacial material from a substrate, in accordance with embodiments of the present technology.
FIG. 7C is a partially schematic illustration showing replenishment of an interfacial material from a curable material, in accordance with embodiments of the present technology.

FIG. 7A is a partially schematic illustration of a system 700a for additive manufacturing configured in accordance with embodiments of the present technology. The system 700a includes a substrate 702 configured to support a curable material 704. The substrate 702 can include any of the substrate features described herein, such as multiple layers (e.g., as described in Section II.A), self-healing capa-bilities (e.g., as described in Section II.B), etc. The substrate 702 can serve as a window (e.g., the window 210 of FIG. 2), a carrier film (e.g., the carrier film 310 of FIG. 3), or other component of a printer assembly that is interposed between the curable material 704 and an energy source.

The system 700a includes an interfacial material 706 between the substrate 702 and the curable material 704. As shown in FIG. 7A, the interfacial material 706 can form a liquid layer covering a surface 708 of the substrate 702 proximate to the curable material 704, such that the curable material 704 does not directly contact the surface 708. The interfacial material 706 can be a liquid or liquid-like sub-stance that is capable of flowing and/or leveling to maintain a continuous liquid layer between the substrate 702 and the curable material 704. Accordingly, the interfacial material 706 can inhibit adhesion of the curable material 704 to the surface 708 of the substrate 702 due to mechanical interac-tions (e.g., adsorption). The presence of the interfacial material 706 can also prevent the curable material 704 from being cured all the way up to the surface 708, thus inhibiting formation of covalent bonds between the cured material and the surface 708. In some embodiments, the interfacial mate-rial 706 also has high oxygen solubility and/or permeability to inhibit polymerization of the curable material 704 at or proximate to the surface 708 of the substrate 702.

The interfacial material 706 can have a surface energy that is between the surface energy of the curable material 704 and the surface energy of the substrate 702, such that the interfacial material 706 preferentially accumulates and remains at the interface between the curable material 704 and the substrate 702 as a continuous liquid layer. For instance, in embodiments where the substrate 702 has a low surface energy (e.g., due to the presence of a separation layer at the surface 708), and the curable material 704 has a high surface energy, the interfacial material 706 can have a greater surface energy than the substrate 702, and a lower surface energy than the curable material 704. In some embodiments, the surface energy of the interfacial material 706 is close to the surface energy of the substrate 702 than the surface energy of the curable material 704, e.g., the magnitude of the difference between the surface energy of the interfacial material 706 and the substrate 702 is less than the magnitude of the difference between the surface of the interfacial material 706 and the curable material 704.

The layer of the interfacial material 706 can have any suitable thickness $T_6$, such as a thickness of at least 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1 mm, 1.25 mm, 1.5 mm, 1.75 mm, or 2 mm; and/or no more than 2 mm, 1.75 mm, 1.5 mm, 1.25 mm, 1 mm, 0.9 mm, 0.8 mm, 0.7 mm, 0.6 mm, 0.5 mm, 0.4 mm, 0.3 mm, 0.2 mm, 0.1 mm, or 0.05 mm. The first thickness $T_6$ can be within a range from 0.01 mm to 0.05 mm, 0.05 mm to 0.1 mm, 0.1 mm to 0.2 mm, 0.1 mm to 0.5 mm, 0.1 mm to 1 mm, 0.5 mm to 1 mm, 0.5 mm to 2 mm, or 1 mm to 2 mm. Optionally, the interfacial material 706 can be one or more molecular monolayers, such that the thickness $T_6$ is on a nanometer or sub-nanometer scale. The thickness $T_6$ can depend on the mechanism used to form the layer of the interfacial material 706, as described in greater detail below.

In some embodiments, the interfacial material 706 has little or no solubility with the curable material 704, such that the interfacial material 706 does not migrate into the curable material 704, and vice-versa. For example, if the curable material 306 is a polar compound, the interfacial material 706 can be a nonpolar compound; if the curable material 704 is a nonpolar compound, the interfacial material 706 can be a polar compound; if the curable material 704 is a hydro-philic compound, the interfacial material 706 can be a hydrophobic compound; if the curable material 704 is a hydrophobic compound, the interfacial material 706 can be a hydrophilic compound; if the curable material 704 is an oleophilic compound, the interfacial material 706 can be an oleophobic compound; if the curable material 704 is an oleophobic compound, the interfacial material 706 can be an oleophilic compound; and so on. Similarly, the interfacial material 706 can have little or no solubility with the cured material formed by applying energy to the curable material 704, to inhibit the interfacial material 706 from migrating into the printed object.

In some embodiments, the interfacial material 706 has little or no solubility with the material of the substrate 702, such that the interfacial material 706 does not migrate into the substrate 702. In such embodiments, it can be beneficial to apply a surface treatment to the substrate 702 to enhance wetting of the surface 708 with the interfacial material 706. For example, the interfacial material 706 can be incorporated onto the surface 708 via chemical grafting and/or other surface modification techniques. Optionally, a random or block copolymer of the interfacial material 706 and the material of the substrate 702 can be incorporated onto the surface 708 via chemical grafting and/or other surface modification techniques. Alternatively or in combination, surfactants and/or other surface-active compounds can be used to improve compatibility of the interfacial material 706 with the substrate 702.

In some embodiments, the interfacial material 706 can have some solubility with the material of the substrate 702, such that the interfacial material 706 does migrate into the substrate 702. For example, if the substrate 702 is or includes a fluorinated material (e.g., a fluoropolymer such as FEP), the interfacial material 706 can also be a fluorinated material (e.g., a fluorinated oil, such as fluorinated ethers, esters, hydrocarbons, etc.). The interfacial material 706 can optionally be a low molecular weight version of the material of the substrate 702. This approach can be used to form a reservoir of the interfacial material 706 within the substrate 702, as discussed further below in connection with FIG. 7B. Alternatively or in combination, migration of the interfacial material 706 into the substrate 702 can produce a plasticizing effect that reduces the stiffness and/or hardness of the substrate 702, which can make the substrate 702 more resistant to mechanical damage.

The interfacial material 706 can have any suitable molecular weight. For example, the interfacial material 706 can have a molecular weight greater than or equal to 0.5 kDa, 1 kDa, 5 kDa, 10 kDa, 20 kDa, 30 kDa, 40 kDa, or 50 kDa; less than or equal to 50 kDa, 40 kDa, 30 kDa, 20 kDa, 10 kDa, 5 kDa, 1 kDa, 0.5 kDa, 0.2 kDa, or 0.1 kDa; and/or within a range from 0.1 kDa to 1 kDa, 1 kDa to 10 kDa, or 10 kDa to 50 kDa.

In some embodiments, the interfacial material 706 is a high viscosity liquid (e.g., a gel or resin), such as a liquid having a viscosity greater than or equal to 0.5 P, 1 P, 5 P, or 10 P. Examples of high viscosity liquids that can be used as the interfacial material 706 include PDMS, silicone oil, vacuum grease, PVC, fluorinated oligomers, polyethers, and polyhydroxyethylene. High viscosity liquids may flow more slowly, and thus it may take longer to reform the liquid layer after a disruption. However, high viscosity liquids can be more robust to disruptions and can last longer on the substrate 702 without requiring replenishment. In some embodiments, the high viscosity liquid is applied to the surface 708 of the substrate 702 as a relatively thick layer (e.g., the thickness $T_6$ can be within a range from 0.01 mm to 1 mm) using mechanical techniques such as roll coating, blade coating, spraying, dipping, etc.

In some embodiments, the interfacial material 706 is a low viscosity liquid, such as a liquid having a viscosity less than or equal to 1 P, 0.5 P, 0.1 P, or 0.05 P. Examples of low viscosity liquids that can be used as the interfacial material 706 includes low molecular weight oligomers of the material of the substrate 702, fluorinated lubricants, vegetable oils, silanes, siloxanes (e.g., low molecular weight siloxanes, cyclic siloxanes), vacuum grease, water, glycerin, and polyethers. Low viscosity liquids may flow more quickly, and thus can rapidly reform the liquid layer after a disruption. For instance, the low viscosity liquid can preferentially diffuse to the interface between the substrate 702 and the curable material 704 due to surface energy effects, and thus may not require mechanical techniques to produce a continuous liquid layer of the interfacial material 706. In some embodiments, the low viscosity liquid forms one or more molecular monolayers on the surface 708. However, low viscosity liquids can be carried off the substrate 702 over time, and thus may need to be replenished more frequently.

The interfacial material 706 can be partially or fully transparent to the energy wavelength(s) for curing the curable material. In some embodiments, the interfacial material 706 exhibits a transmittance of at least 50%, 60%, 70%, 75%, 80%, 85%, 90%, 95%, 99%, or 99.9% for the energy wavelength(s). Optionally, the interfacial material 706 can have the same or similar refractive indices as the material of the substrate 702 (e.g., the difference in refractive indices can be within a range from 0.1 to 0.3, and/or the refractive index contrast can be no more than 0.05, 0.01, or 0.005).

The various properties of the interfacial material 706 described herein can be combined in many different ways, depending on the characteristics of the substrate 702 and the curable material 704, and the desired interactions between these components. For instance, the interfacial material 706 can be a low molecular weight liquid that is soluble in the substrate 702; the interfacial material 706 can be a high molecular weight liquid that is soluble in the substrate 702; the interfacial material 706 can be a low molecular weight liquid that is insoluble in the substrate 702; and so on.

The layer of the interfacial material 706 can be formed in various ways. In some embodiments, the interfacial material 706 is applied to the surfaces 708 of the substrate 702 using mechanical techniques, such as roll coating, blade coating, spraying, dipping, etc. In such embodiments, the interfacial material 706 can be applied to the surface 708 of the substrate 702 while the substrate 702 remains in place on the printer assembly (e.g., using rollers, blades, or other coating mechanisms that are present in the printer assembly), or the interfacial material 706 can be applied while the substrate 702 is separate from the printer assembly.

FIG. 7B is a partially schematic illustration of a system 700b in which the interfacial material 706 is replenished from the substrate 702, in accordance with embodiments of the present technology. As shown in FIG. 7B, the interfacial material 706 can be soluble in the material of the substrate 702, such that the interfacial material 706 can be dissolved into the substrate 702. In embodiments where the substrate 702 includes a plurality of layers (e.g., as described in Section II.A), the interfacial material 706 can be soluble in the uppermost layer of the substrate 702 only, or can also be soluble in other layers of the substrate 702.

The interfacial material 706 can have a surface energy between the surface energy of the substrate 702 and the surface energy of the curable material 704, such that the interfacial material 706 preferentially migrates to the surface 708 of the substrate 702 to form a continuous liquid layer (e.g., one or more molecular monolayers). However, the surface energy of the interfacial material 706 can still be sufficiently close to that of the substrate 702 so at least some of the interfacial material 706 remains within the substrate 702. The substrate 702 can therefore serve as a reservoir of the interfacial material 706 that allows the layer of the interfacial material 706 on the surface 708 to be automatically replenished via diffusion.

FIG. 7C is a partially schematic illustration of a system 700c in which the interfacial material 706 is replenished from the curable material 704, in accordance with embodiments of the present technology. In the illustrated embodiment, the interfacial material 706 has little or no solubility in the substrate 702. Instead, to replenish the layer of the interfacial material 706 at the surface 708, additional interfacial material 706 can be mixed into the curable material 704. Optionally, the interfacial material 706 can be combined with surfactants to facilitate mixing with the curable material 704, since the interfacial material 706 may otherwise have little or no solubility with the curable material 704. The interfacial material 706 can have a surface energy between the surface energy of the substrate 702 and the surface energy of the curable material 704, such that the interfacial material 706 preferentially migrates to the surface 708 of the substrate 702 to form a continuous liquid layer (e.g., one or more molecular monolayers). Accordingly, the layer of the interfacial material 706 on the surface 708 can be automatically replenished via diffusion of the interfacial material 706 out of the curable material 704.

III. Dental Appliances and Associated Methods

Figure 8A:
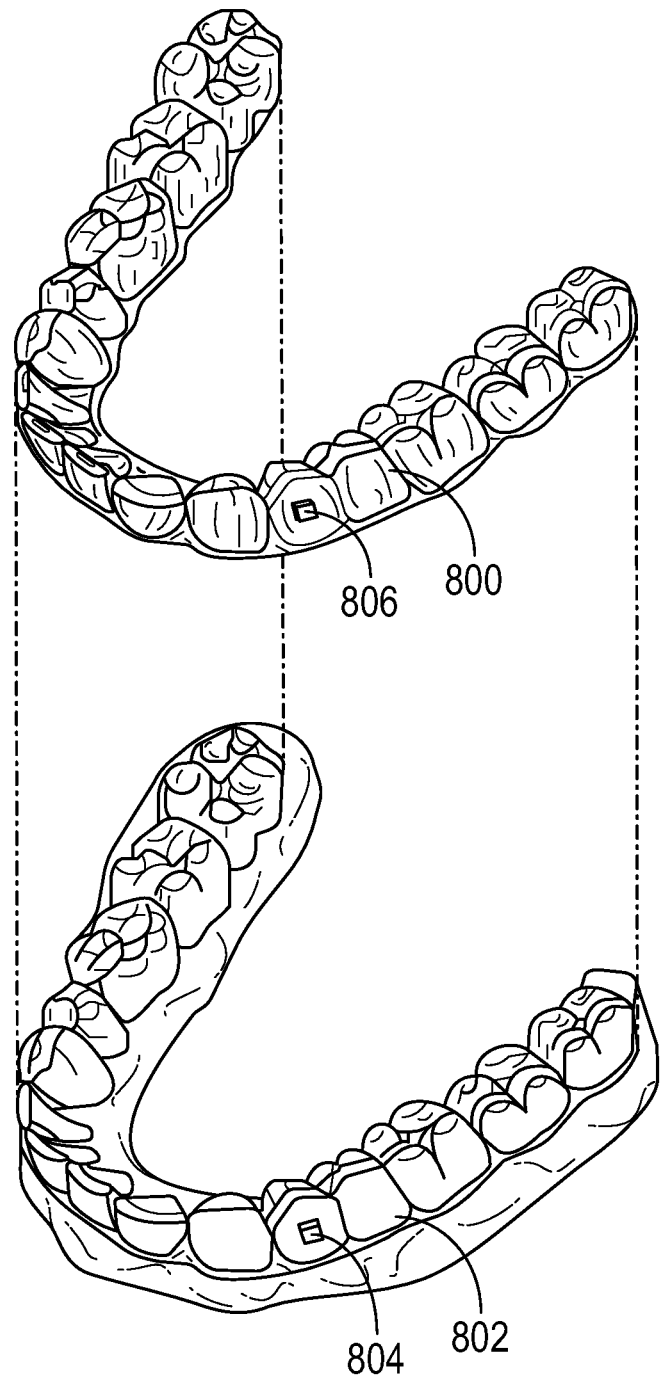
FIG. 8A illustrates a representative example of a tooth repositioning appliance configured in accordance with embodiments of the present technology.

FIG. 8A illustrates a representative example of a tooth repositioning appliance 800 configured in accordance with embodiments of the present technology. The appliance 800 can be manufactured using any of the systems, methods, and devices described herein. The appliance 800 (also referred to herein as an "aligner") can be worn by a patient in order to achieve an incremental repositioning of individual teeth 802 in the jaw. The appliance 800 can include a shell (e.g., a continuous polymeric shell or a segmented shell) having teeth-receiving cavities that receive and resiliently reposition the teeth. The appliance 800 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance.

The appliance 800 can fit over all teeth present in an upper or lower jaw, or less than all of the teeth. The appliance 800 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 800 can be a generic appliance configured to receive the teeth, but not necessarily shaped to match the topography of the patient's teeth. In some cases, only certain teeth received by the appliance 800 are repositioned by the appliance 800 while other teeth can provide a base or anchor region for holding the appliance 800 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In preferred embodiments, no wires or other means are provided for holding the appliance 800 in place over the teeth. In some cases, however, it may be desirable or necessary to provide individual attachments 804 or other anchoring elements on teeth 802 with corresponding receptacles 806 or apertures in the appliance 800 so that the appliance 800 can apply a selected force on the tooth. Representative examples of appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 8B:
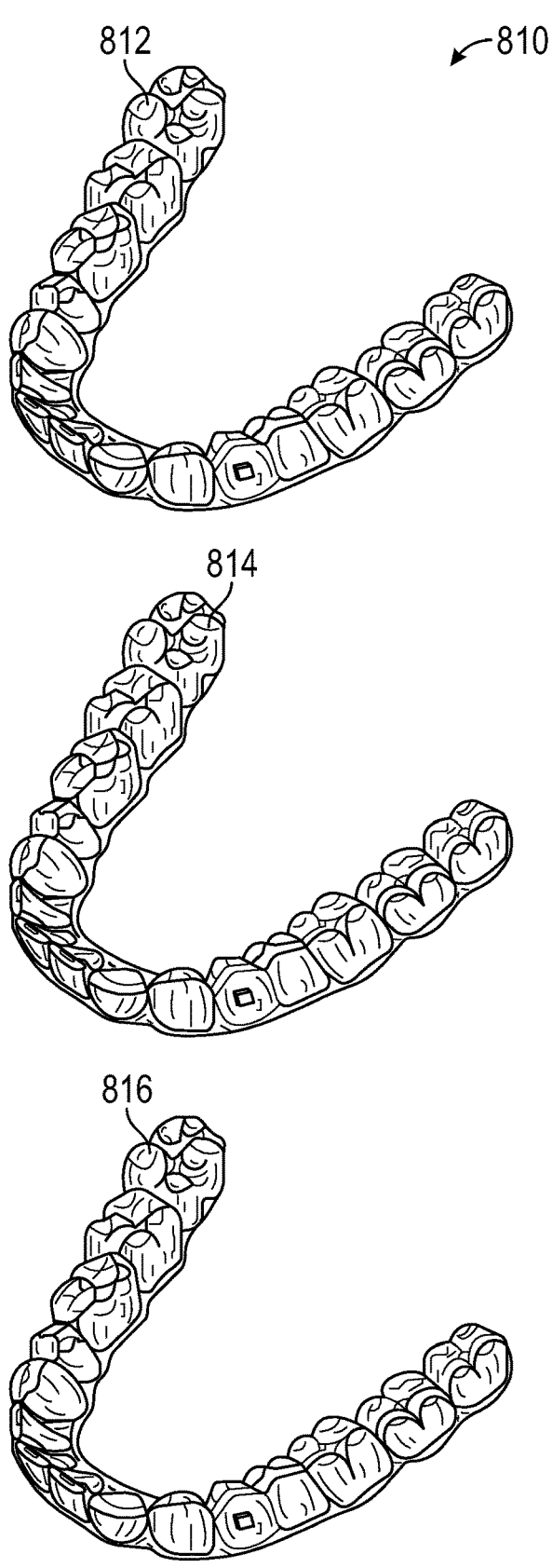
FIG. 8B illustrates a tooth repositioning system including a plurality of appliances, in accordance with embodiments of the present technology.

FIG. 8B illustrates a tooth repositioning system 810 including a plurality of appliances 812, 814, 816, in accordance with embodiments of the present technology. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 810 can include a first appliance 812 corresponding to an initial tooth arrangement, one or more intermediate appliances 814 corresponding to one or more intermediate arrangements, and a final appliance 816 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 8C:
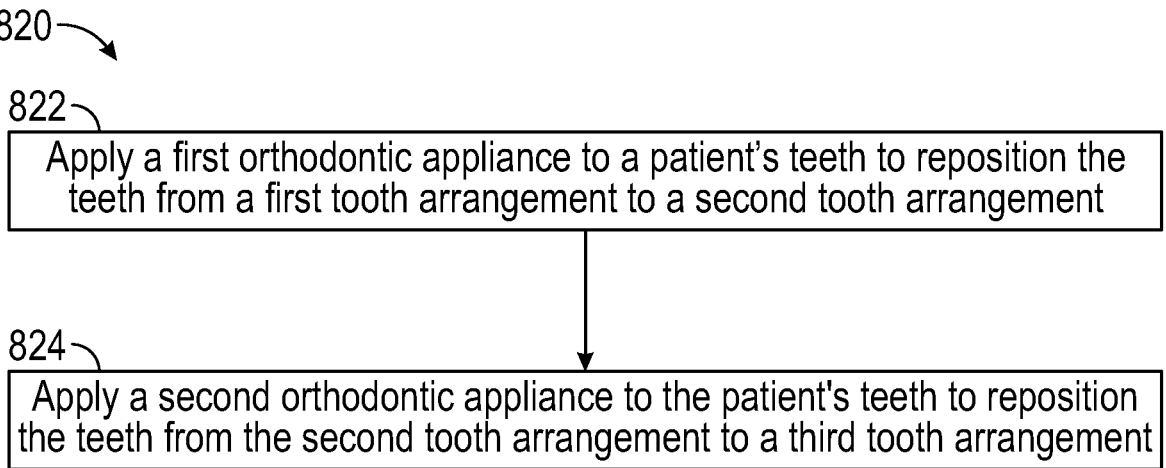
FIG. 8C illustrates a method of orthodontic treatment using a plurality of appliances, in accordance with embodiments of the present technology.

FIG. 8C illustrates a method 820 of orthodontic treatment using a plurality of appliances, in accordance with embodiments of the present technology. The method 820 can be practiced using any of the appliances or appliance sets described herein. In block 822, a first orthodontic appliance is applied to a patient's teeth in order to reposition the teeth from a first tooth arrangement to a second tooth arrangement. In block 824, a second orthodontic appliance is applied to the patient's teeth in order to reposition the teeth from the second tooth arrangement to a third tooth arrangement. The method 820 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 9 illustrates a method 900 for designing an orthodontic appliance, in accordance with embodiments of the present technology. The method 900 can be applied to any embodiment of the orthodontic appliances described herein. Some or all of the steps of the method 900 can be performed by any suitable data processing system or device, e.g., one or more processors configured with suitable instructions.

In block 902, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 904, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, block 904 can involve determining a particular type of force to be applied (e.g., extrusive force, intrusive force, translational force, rotational force, tipping force, torquing force, etc.) without calculating the specific magnitude and/or direction of the force.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 906, a design for an orthodontic appliance configured to produce the force system is determined. The design can include the appliance geometry, material composition and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 908, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 900 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 900 may be performed with any suitable fabrication system or device, such as the embodiments described herein. Some of the steps may be optional, e.g., the process of block 904 can be omitted, such that the orthodontic appliance is designed based on the desired tooth movements and/or determined tooth movement path, rather than based on a force system. Moreover, the order of the steps can be varied as desired.

FIG. 10 illustrates a method 1000 for digitally planning an orthodontic treatment and/or design or fabrication of an appliance, in accordance with embodiments. The method 1000 can be applied to any of the treatment procedures described herein and can be performed by any suitable data processing system.

In block 1002 a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1004, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1006, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 10, design and/or fabrication of an orthodontic appliance, and perhaps a particular orthodontic treatment, may include use of a representation of the patient's teeth (e.g., including receiving a digital representation of the patient's teeth (block 1002)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537, 406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment placement templates, e.g., appliances used to position prefabricated attachments on a person's teeth in accordance with one or more aspects of a treatment plan. Examples of attachment placement devices (also known as "attachment placement templates" or "attachment fabrication templates") can be found at least in: U.S. application Ser. No. 17/249,218, entitled "Flexible 3D Printed Orthodontic Device," filed Feb. 24, 2021; U.S. application Ser. No. 16/366,686, entitled "Dental Attachment Placement Structure," filed Mar. 27, 2019; U.S. application Ser. No. 15/674,662, entitled, "Devices and Systems for Creation of Attachments," filed Aug. 11, 2017; U.S. Pat. No. 11,103, 330, entitled "Dental Attachment Placement Structure," filed Jun. 14, 2017; U.S. application Ser. No. 14/963,527, entitled "Dental Attachment Placement Structure," filed Dec. 9, 2015; U.S. application Ser. No. 14/939,246, entitled "Dental Attachment Placement Structure," filed Nov. 12, 2015; U.S. application Ser. No. 14/939,252, entitled "Dental Attachment Formation Structures," filed Nov. 12, 2015; and U.S. Pat. No. 9,700,385, entitled "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled "Releasable Palatal Expanders," filed Apr. 10, 2019; U.S. application Ser. No. 16/022,552, entitled "Devices, Systems, and Methods for Dental Arch Expansion," filed Jun. 28, 2018; U.S. Pat. No. 11,045,283, entitled "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled "Methods and Apparatuses for Customizing a Rapid Palatal Expander," filed Dec. 4, 2017; and U.S. Pat. No. 7,192,273, entitled "System and Method for Palatal Expansion," filed Aug. 7, 2003; all of which are incorporated by reference herein in their entirety.

EXAMPLES

The following examples are included to further describe some aspects of the present technology, and should not be used to limit the scope of the technology.

Example 1. A device for manufacturing an object from a curable material, the device comprising:

a substrate configured to support the curable material during an additive manufacturing process, wherein the substrate is at least partially transparent to a wavelength of energy that cures the curable material, and wherein the substrate comprises:

a first layer comprising a first material configured to inhibit adhesion to the curable material, and a second layer coupled to the first layer, wherein the second layer comprises a second material having one or more of increased mechanical strength or increased heat resistance relative to the first material.

Example 2. The device of Example 1, wherein the first material comprises a fluorinated polymer.

Example 3. The device of Example 2, wherein the fluorinated polymer comprises fluorinated ethylene propylene, ethylene tetrafluoroethylene, polytetrafluoroethylene, perfluoroalkoxy alkane, polyvinylidene fluoride, polychlorotrifluoroethylene, ethylenechlorotrifluoroethylene, perfluorocycloalkene, perfluoromethylvinyl ether, perfluorosulfonic acid polymer, perfluoropolyether, or a combination thereof.

Example 4. The device of any one of Examples 1 to 3, wherein the first material comprises a siloxane, a polysiloxane, a silane, or a polysilane.

Example 5. The device of any one of Examples 1 to 4, wherein the first material has a lower surface energy than the second material.

Example 6. The device of any one of Examples 1 to 5, wherein the first material comprises a self-healing material.

Example 7. The device of Example 6, wherein the self-healing material is configured to self-heal upon application of heat or light.

Example 8. The device of any one of Examples 1 to 7, wherein the second material comprises polydimethylsiloxane, polyethylene terephthalate, polyethylene terephthalate glycol, polycarbonate, polymethyl methacrylate, polyvinyl chloride, cyclic olefin copolymer, polyethylene, polypropylene, styrene methyl methacrylate, styrene acrylonitrile, acrylonitrile butadiene styrene, or a combination thereof.

Example 9. The device of any one of Examples 1 to 8, wherein the second material has a higher glass transition temperature than the first material.

Example 10. The device of any one of Examples 1 to 9, wherein the second material has a glass transition temperature of at least 80° C.

Example 11. The device of any one of Examples 1 to 10, wherein the second material has a higher elastic modulus than the first material.

Example 12. The device of any one of Examples 1 to 11, wherein the first layer is a coating on the second layer.

Example 13. The device of any one of Examples 1 to 12, wherein the substrate is a carrier film configured to convey the curable material through a printer assembly.

Example 14. The device of Example 13, wherein the carrier film comprises a first end, a second end, and a length extending between the first and second ends, and the first and second ends are coupled to each other at a connection region.

Example 15. The device of Example 14, further comprising a bridge segment coupling the first end to the second end at the connection region.

Example 16. The device of Example 15, wherein the bridge segment comprises one or more of the first material or the second material.

Example 17. The device of Example 14, wherein the first end is coupled to the second end without a bridge segment.

Example 18. The device of any one of Examples 1 to 12, wherein the substrate is a window of a vat configured to contain the curable material.

Example 19. The device of any one of Examples 1 to 18, wherein the first layer is in direct contact with the second layer.

Example 20. The device of any one of Examples 1 to 18, wherein the substrate comprises at least one additional layer between the first layer and the second layer.

Example 21. The device of Example 20, wherein the at least one additional layer comprises one or more of an adhesive layer, a barrier layer, or a compatibility layer.

Example 22. The device of any one of Examples 1 to 21, wherein the substrate comprises:

a first surface configured to be oriented toward the curable material, the first layer forming at least part of the first surface; and a second surface configured to be oriented away from the curable material.

Example 23. The device of Example 22, wherein the first surface is configured to be in direct contact with the curable material.

Example 24. The device of Example 22, wherein the first surface is configured to be in direct contact with an interfacial material interposed between the curable material and the substrate.

Example 25. The device of any one of Examples 22 to 24, wherein the second layer forms at least part of the second surface.

Example 26. The device of any one of Examples 22 to 24, wherein the substrate comprises at least one additional layer between the second layer and the second surface.

Example 27. The device of Example 26, wherein the at least one additional layer comprises one or more of an anti-slip layer or an anti-reflection layer.

Example 28. A method comprising:

supporting a curable material on a substrate, wherein the substrate comprises:

a first layer comprising a first material configured to inhibit adhesion to the curable material, and a second layer coupled to the first layer, wherein the second layer comprises a second material having one or more of increased mechanical strength or increased heat resistance relative to the first material; and applying energy through the substrate and toward the curable material to form a portion of an object via an additive manufacturing process.

Example 29. The method of Example 28, wherein the first material comprises a fluorinated polymer.

Example 30. The method of Example 29, wherein the fluorinated polymer comprises fluorinated ethylene propylene, ethylene tetrafluoroethylene, polytetrafluoroethylene, perfluoroalkoxy alkane, polyvinylidene fluoride, polychlorotrifluoroethylene, ethylenechlorotrifluoroethylene, perfluorocycloalkene, perfluoromethylvinyl ether, perfluorosulfonic acid polymer, perfluoropolyether, or a combination thereof.

Example 31. The method of any one of Examples 28 to 30, wherein the first material comprises a siloxane, a polysiloxane, a silane, or a polysilane.

Example 32. The method of any one of Examples 28 to 31, wherein the first material has a lower surface energy than the second material.

Example 33. The method of any one of Examples 28 to 32, wherein the first material comprises a self-healing material.

Example 34. The method of Example 33, further comprising applying second energy to the substrate to activate the self-healing material.

Example 35. The method of any one of Examples 28 to 34, wherein the second material comprises polydimethylsiloxane, polyethylene terephthalate, polyethylene terephthalate glycol, polycarbonate, polymethyl methacrylate, polyvinyl chloride, cyclic olefin copolymer, polyethylene, polypropylene, styrene methyl methacrylate, styrene acrylonitrile, acrylonitrile butadiene styrene, or a combination thereof.

Example 36. The method of any one of Examples 28 to 35, wherein the second material has a higher glass transition temperature than the first material.

Example 37. The method of any one of Examples 28 to 36, further comprising heating the curable material to an elevated temperature, wherein the second material has a glass transition temperature higher than the elevated temperature.

Example 38. The method of any one of Examples 28 to 37, wherein the second material has a higher elastic modulus than the first material.

Example 39. The method of any one of Examples 28 to 38, wherein the first layer is a coating on the second layer.

Example 40. The method of any one of Examples 28 to 39, wherein the substrate is a carrier film, and the method further comprises moving the carrier film in a loop trajectory.

Example 41. The method of Example 40, wherein the carrier film comprises a first end, a second end, and a length extending between the first and second ends, and the first and second ends are coupled to each other at a connection region.

Example 42. The method of Example 41, wherein the carrier film further comprises a bridge segment coupling the first end to the second end at the connection region.

Example 43. The method of Example 42, wherein the bridge segment comprises one or more of the first material or the second material.

Example 44. The method of Example 41, wherein the first end is coupled to the second end without a bridge segment.

Example 45. The method of any one of Examples 28 to 39, wherein the substrate is a window of a vat configured to contain the curable material.

Example 46. The method of any one of Examples 28 to 45, wherein the first layer is in direct contact with the second layer.

Example 47. The method of any one of Examples 28 to 45, wherein the substrate comprises at least one additional layer between the first layer and the second layer.

Example 48. The method of Example 47, wherein the at least one additional layer comprises one or more of an adhesive layer, a barrier layer, or a compatibility layer.

Example 49. The method of any one of Examples 28 to 48, wherein the substrate comprises:

a first surface configured to be oriented toward the curable material, the first layer forming at least part of the first surface; and a second surface configured to be oriented away from the curable material.

Example 50. The method of Example 49, wherein the first surface is configured to be in direct contact with the curable material.

Example 51. The method of Example 49, wherein the first surface is configured to be in direct contact with an interfacial material interposed between the curable material and the substrate.

Example 52. The method of any one of Examples 49 to 51, wherein the second layer forms at least part of the second surface.

Example 53. The method of any one of Examples 49 to 51, wherein the substrate comprises at least one additional layer between the second layer and the second surface.

Example 54. The method of Example 53, wherein the at least one additional layer comprises one or more of an anti-slip layer or an anti-reflection layer.

Example 55. A method comprising:

supporting a curable material on a substrate during an additive manufacturing process, wherein the substrate comprises a self-healing material;

receiving sensor data indicative of a state of the substrate;

determining whether the substrate includes a damaged portion, based on the sensor data; and upon a determination that the substrate includes the damaged portion, applying energy to the substrate to activate the self-healing material to repair the damaged portion.

Example 56. The method of Example 55, wherein the self-healing material comprises a self-healing polymer.

Example 57. The method of Example 56, wherein the self-healing polymer comprises a crosslinked network.

Example 58. The method of any one of Examples 55 to 57, wherein the entire substrate is formed from the self-healing material.

Example 59. The method of any one of Examples 55 to 57, wherein the substrate comprises a surface layer formed from the self-healing material.

Example 60. The method of Example 59, wherein the surface layer is configured to inhibit adhesion of the curable material.

Example 61. The method of Example 59 or 60, wherein the substrate comprises at least one additional layer.

Example 62. The method of Example 61, wherein the at least one additional layer comprises one or more of: a support layer, a barrier layer, a compatibility layer, an adhesion layer, an anti-slip layer, or an anti-reflection layer.

Example 63. The method of any one of Examples 55 to 62, wherein the curable material comprises a hard filler, and the damaged portion results from contact between the hard filler and the substrate.

Example 64. The method of any one of Examples 55 to 63, wherein the sensor data is received from one or more of the following: an imaging device, an optical sensor, an acoustic sensor, a distance sensor, or a force sensor.

Example 65. The method of any one of Examples 55 to 64, wherein the sensor data is indicative of one or more of the following: roughness, adhesiveness, scatter, reflectance, transmittance, appearance, or release forces.

Example 66. The method of any one of Examples 55 to 65, wherein the energy comprises light energy, heat energy, acoustic energy, or radiation energy.

Example 67. The method of any one of Examples 55 to 67, wherein the energy is different from an energy used to cure the curable material.

Example 68. The method of any one of Examples 55 to 67, wherein the energy is the same as an energy used to cure the curable material.

Example 69. The method of any one of Examples 55 to 68, wherein the energy is applied while the curable material is present on the substrate.

Example 70. The method of any one of Examples 55 to 68, further comprising removing the curable material from the substrate, before applying the energy.

Example 71. The method of any one of Examples 55 to 71, wherein the energy is applied while the substrate remains in place in a printer assembly configured to implement the additive manufacturing process.

Example 72. The method of any one of Examples 55 to 71, further comprising removing the substrate from a printer assembly configured to implement the additive manufacturing process, before applying the energy.

Example 73. The method of any one of Examples 55 to 72, wherein the energy is selectively applied to the damaged portion.

Example 74. The method of any one of Examples 55 to 72, wherein the energy is applied to the entire substrate.

Example 75. The method of any one of Examples 55 to 74, further comprising applying a mechanical force to the substrate.

Example 76. The method of Example 75, wherein the mechanical force is configured to maintain a geometry of a remaining portion of the substrate.

Example 77. The method of Example 75 or 76, wherein the mechanical force is applied to the damaged portion.

Example 78. A device for manufacturing an object from a curable material, the device comprising:

a substrate configured to support the curable material during an additive manufacturing process, wherein the substrate is at least partially transparent to a wavelength of energy that cures the curable material, and wherein the substrate includes a self-healing material.

Example 79. The device of Example 78, wherein the self-healing material comprises a self-healing polymer.

Example 80. The device of Example 79, wherein the self-healing polymer comprises a crosslinked network.

Example 81. The device of any one of Examples 78 to 80, wherein the entire substrate is formed from the self-healing material.

Example 82. The device of any one of Examples 78 to 80, wherein the substrate comprises a surface layer formed from the self-healing material.

Example 83. The device of Example 82, wherein the surface layer is configured to inhibit adhesion of the curable material.

Example 84. The device of Example 82 or 83, wherein the substrate comprises at least one additional layer.

Example 85. The device of Example 84, wherein the at least one additional layer comprises one or more of: a support layer, a barrier layer, a compatibility layer, an adhesion layer, an anti-slip layer, or an anti-reflection layer.

Example 86. A system comprising:

the device of any one of Examples 78 to 85; and an energy source configured to output second energy to activate the self-healing material.

Example 87. The system of Example 86, further comprising:

a sensor configured to generate sensor data indicative of a state of the substrate;

a processor operably coupled to the sensor and the energy source; and a memory operably coupled to the processor and storing instructions that, when executed by the processor, cause the system to perform operations comprising:

determining whether the substrate includes a damaged portion, based on the sensor data; and upon a determination that the substrate includes the damaged portion, applying the second energy to the substrate to activate the self-healing material to repair the damaged portion.

Example 88. The system of Example 87, wherein the sensor comprises one or more of the following: an imaging device, an optical sensor, an acoustic sensor, a distance sensor, or a force sensor.

Example 89. The system of Example 87 or 88, wherein the sensor data is indicative of one or more of the following: roughness, adhesiveness, scatter, reflectance, transmittance, appearance, or release forces.

Example 90. The system of any one of Examples 87 to 89, wherein the second energy comprises light energy, heat energy, acoustic energy, or radiation energy.

Example 91. The system of any one of Examples 87 to 90, wherein the second energy is different from the energy that cures the curable material.

Example 92. The system of any one of Examples 87 to 90, wherein the second energy is the same as the energy that cures the curable material.

Example 93. The system of any one of Examples 87 to 92, wherein the second energy is selectively applied to the damaged portion.

Example 94. The system of any one of Examples 87 to 92, wherein the second energy is applied to the entire substrate.

Example 95. A system comprising:
a substrate configured to support a curable material during an additive manufacturing process, wherein the substrate is at least partially transparent to a wavelength of energy that cures the curable material; and
an interfacial material configured to form a liquid layer between the substrate and the curable material.

Example 96. The system of Example 95, wherein the liquid layer of the interfacial material is configured to inhibit adhesion of the curable material to the substrate.

Example 97. The system of Example 95 or 96, wherein the liquid layer of the interfacial material is configured to physically separate the curable material from the substrate.

Example 98. The system of any one of Examples 95 to 97, wherein the interfacial material is insoluble in the curable material.

Example 99. The system of any one of Examples 95 to 98, wherein:
the curable material is hydrophobic and the interfacial material is hydrophilic,
the curable material is hydrophilic and the interfacial material is hydrophobic,
the curable material is oleophobic and the interfacial material is oleophilic, or
the curable material is oleophilic and the interfacial material is oleophobic.

Example 100. The system of any one of Examples 95 to 99, wherein the interfacial material is configured to preferentially accumulate between the substrate and the curable material.

Example 101. The system of any one of Examples 95 to 100, wherein:
the substrate has a first surface energy,
the curable material has a second surface energy, and
the interfacial energy has a third surface energy between the first surface energy and the second surface energy.

Example 102. The system of Example 101, wherein the first surface energy is less than the second surface energy, and the second surface energy is less than the third surface energy.

Example 103. The system of any one of Examples 95 to 102, wherein the liquid layer is one or more molecular monolayers of the interfacial material.

Example 104. The system of any one of Examples 95 to 102, wherein the liquid layer has a thickness within a range from 0.01 mm to 1 mm.

Example 105. The system of any one of Examples 95 to 104, wherein the interfacial material is soluble in the substrate.

Example 106. The system of any one of Examples 95 to 104, wherein the interfacial material is insoluble in the substrate.

Example 107. The system of any one of Examples 95 to 106, wherein the interfacial material is at least partially transparent to the wavelength of the energy that cures the curable material.

Example 108. A method comprising:
supporting a curable material on a substrate;
forming a liquid layer between the curable material and the substrate from an interfacial material; and
applying energy through the substrate, through the interfacial material, and toward the curable material to form a portion of an object via an additive manufacturing process.

Example 109. The method of Example 108, further comprising inhibiting adhesion of the portion of the object to the substrate via the liquid layer.

Example 110. The method of Example 108 or 109, wherein the curable material is spaced apart from the substrate by the liquid layer.

Example 111. The method of any one of Examples 108 to 110, wherein the interfacial material is insoluble in the curable material.

Example 112. The method of any one of Examples 108 to 111, wherein:
the curable material is hydrophobic and the interfacial material is hydrophilic,
the curable material is hydrophilic and the interfacial material is hydrophobic,
the curable material is oleophobic and the interfacial material is oleophilic, or
the curable material is oleophilic and the interfacial material is oleophobic.

Example 113. The method of any one of Examples 108 to 112, wherein the interfacial material is configured to preferentially accumulate between the substrate and the curable material.

Example 114. The method of any one of Examples 108 to 113, wherein:
the substrate has a first surface energy,
the curable material has a second surface energy, and
the interfacial energy has a third surface energy between the first surface energy and the second surface energy.

Example 115. The method of Example 114, wherein the first surface energy is less than the second surface energy, and the second surface energy is less than the third surface energy.

Example 116. The method of any one of Examples 108 to 115, wherein the liquid layer is one or more molecular monolayers of the interfacial material.

Example 117. The method of any one of Examples 108 to 115, wherein the liquid layer has a thickness within a range from 0.01 mm to 1 mm.

Example 118. The method of any one of Examples 108 to 117, wherein the interfacial material is soluble in the substrate.

Example 119. The method of any one of Examples 108 to 117, wherein the interfacial material is insoluble in the substrate.

Example 120. The method of any one of Examples 108 to 119, wherein the interfacial material is at least partially transparent to the wavelength of the energy that cures the curable material.

Example 121. The method of any one of Examples 108 to 120, wherein forming the liquid layer comprises applying the interfacial material to the substrate using one or more roll coating, blade coating, spraying, or dipping.

Example 122. The method of any one of Examples 108 to 120, wherein forming the liquid layer comprises:

dissolving the interfacial material into the substrate, and allowing the interfacial material to diffuse out of the substrate toward the curable material.

Example 123. The method of any one of Examples 108 to 120, wherein forming the liquid layer comprises:

combining the interfacial material with the curable material, and allowing the interfacial material to diffuse out of the curable material toward the substrate.

CONCLUSION

Although many of the embodiments are described above with respect to systems, devices, and methods for additive manufacturing of dental appliances, the technology is applicable to other applications and/or other approaches, such as additive manufacturing of other objects. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-10.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A device for manufacturing an object from a curable material, the device comprising:

a substrate configured to support the curable material during an additive manufacturing process, wherein the substrate comprises a surface configured to contact the curable material, wherein the substrate is at least partially transparent to a wavelength of energy that cures the curable material, and wherein the substrate comprises:

a first layer forming at least part of the surface of the substrate, the first layer comprising a first material configured to inhibit adhesion to the curable material, and a second layer coupled to the first layer, wherein the second layer comprises a second material having a higher elastic modulus than the first material.

2. The device of claim 1, wherein the first material comprises a fluorinated polymer.

3. The device of claim 2, wherein the fluorinated polymer comprises fluorinated ethylene propylene, ethylene tetrafluoroethylene, polytetrafluoroethylene, perfluoroalkoxy alkane, polyvinylidene fluoride, polychlorotrifluoroethylene, ethylenechlorotrifluoroethylene, perfluorocycloalkene, perfluoromethylvinyl ether, perfluorosulfonic acid polymer, perfluoropolyether, or a combination thereof.

4. The device of claim 1, wherein the first material comprises a siloxane, a polysiloxane, a silane, or a polysilane.

5. The device of claim 1, wherein the second material comprises polydimethylsiloxane, polyethylene terephthalate, polyethylene terephthalate glycol, polycarbonate, polymethyl methacrylate, polyvinyl chloride, cyclic olefin copolymer, polyethylene, polypropylene, styrene methyl methacrylate, styrene acrylonitrile, acrylonitrile butadiene styrene, or a combination thereof.

6. The device of claim 1, wherein the second material has a higher glass transition temperature than the first material.

7. The device of claim 1, wherein the second material has a glass transition temperature of at least 80° C.

8. The device of claim 1, wherein the first layer is a coating on the second layer.

9. The device of claim 1, wherein the substrate is a carrier film configured to convey the curable material through a printer assembly.

10. The device of claim 9, wherein the carrier film comprises a first end, a second end, and a length extending between the first and second ends, and the first and second ends are coupled to each other at a connection region.

11. The device of claim 10, further comprising a bridge segment coupling the first end to the second end at the connection region.

12. The device of claim 11, wherein the bridge segment comprises one or more of the first material or the second material.

13. The device of claim 10, wherein the first end is coupled to the second end without a bridge segment.

14. The device of claim 1, wherein the first layer is in direct contact with the second layer.

15. The device of claim 1, wherein the substrate comprises at least one additional layer between the first layer and the second layer.

16. The device of claim 15, wherein the at least one additional layer comprises one or more of an adhesive layer, a barrier layer, or a compatibility layer.

17. The device of claim 1, wherein the surface is a first surface, and wherein the substrate comprises a second surface configured to be oriented away from the curable material.

18. The device of claim 17, wherein the second layer forms at least part of the second surface.

19. The device of claim 17, wherein the substrate comprises at least one additional layer between the second layer and the second surface, and wherein the at least one additional layer comprises one or more of an anti-slip layer or an anti-reflection layer.

20. The device of claim 1, wherein the second material has increased heat resistance relative to the first material.

* * * * *